(12) United States Patent
Bae et al.

(10) Patent No.: US 10,735,956 B2
(45) Date of Patent: Aug. 4, 2020

(54) METHOD AND DEVICE FOR MANAGING SECURITY ACCORDING TO SERVICE IN WIRELESS COMMUNICATION SYSTEM

(71) Applicant: Samsung Electronics Co., Ltd., Gyeonggi-do (KR)

(72) Inventors: Beomsik Bae, Suwon-si (KR); Joohyung Lee, Gwacheon-si (KR); Hanna Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 15/642,261

(22) Filed: Jul. 5, 2017

(65) Prior Publication Data
US 2018/0007552 A1 Jan. 4, 2018

(30) Foreign Application Priority Data
Jul. 4, 2016 (KR) .................. 10-2016-0084410

(51) Int. Cl.
*H04W 12/06* (2009.01)
*H04L 29/06* (2006.01)
(Continued)

(52) U.S. Cl.
CPC ............. *H04W 12/06* (2013.01); *H04L 63/06* (2013.01); *H04L 63/08* (2013.01); *H04L 63/083* (2013.01);
(Continued)

(58) Field of Classification Search
CPC combination set(s) only.
See application file for complete search history.

(56) References Cited

U.S. PATENT DOCUMENTS

| 8,045,715 B2 | 10/2011 | Kuo |
| 2010/0228967 A1 | 9/2010 | Hahn et al. |

(Continued)

FOREIGN PATENT DOCUMENTS

KR 10-2009-0039593 A 4/2009

OTHER PUBLICATIONS

ISA/KR, "International Search Report," International Application No. PCT/KR2017/007088, dated Oct. 30, 2017, 3 pages.
(Continued)

*Primary Examiner* — Lynn D Feild
*Assistant Examiner* — Richard A McCoy

(57) ABSTRACT

The present disclosure relates to a communication method and system for converging a 5th-generation (5G) communication system for supporting higher data rates beyond a 4th-generation (4G) system with a technology for internet of things (IoT). The present disclosure may be applied to intelligent services based on the 5G communication technology and the IoT-related technology, such as smart home, smart building, smart city, smart car, connected car, health care, digital education, smart retail, security and safety services. A method of a terminal according to the present disclosure includes: transmitting connection request messages for network slices, which are networks constructed for each service, to a network; receiving response messages including identifiers of the network slices from a base station; and generating security contexts for each network slice based on at least one of the identifiers of the network slices and tokens generated during an authentication process with a third party.

12 Claims, 25 Drawing Sheets

(51) Int. Cl.
  *H04W 12/04* (2009.01)
  *H04W 4/70* (2018.01)
  *H04W 84/04* (2009.01)
  *H04W 88/02* (2009.01)
  *H04W 88/08* (2009.01)

(52) U.S. Cl.
  CPC ......... *H04L 63/0876* (2013.01); *H04W 12/04* (2013.01); *H04L 2463/061* (2013.01); *H04W 4/70* (2018.02); *H04W 84/042* (2013.01); *H04W 88/02* (2013.01); *H04W 88/08* (2013.01)

(56) References Cited

U.S. PATENT DOCUMENTS

| | | | |
|---|---|---|---|
| 2016/0043998 A1 | 2/2016 | Wang et al. | |
| 2017/0111339 A1* | 4/2017 | Lee | H04L 9/00 |
| 2017/0199751 A1* | 7/2017 | Sama | G06F 9/45533 |
| 2018/0048465 A1* | 2/2018 | Schliwa-Bertling | G11B 20/0021 |

OTHER PUBLICATIONS

3GPP TR 22.891 V14.1.0 (Jun. 2016), Technical Report, 3rd Generation Partnership Project; Technical Specification Group Services and System Aspects; Feasibility Study on New Services and Markets Technology Enablers; Stage 1 (Release 14), 97 pages.

Ericsson LM, "SMARTER_NEO:Slicing," S1-161227 (revision of S1-16xxxx), 3GPP TSG-SA WG1 Meeting#74, Venice, Italy, May 9-13, 2016, 6 pages.

LG Electronics Inc., et al., "Add potential requirement of network slice," S1-161337 (revision of S1-161149), 3GPP TSG-SA WG1 #74, Venice, Italy, May 9-13, 2016, 6 pages.

* cited by examiner

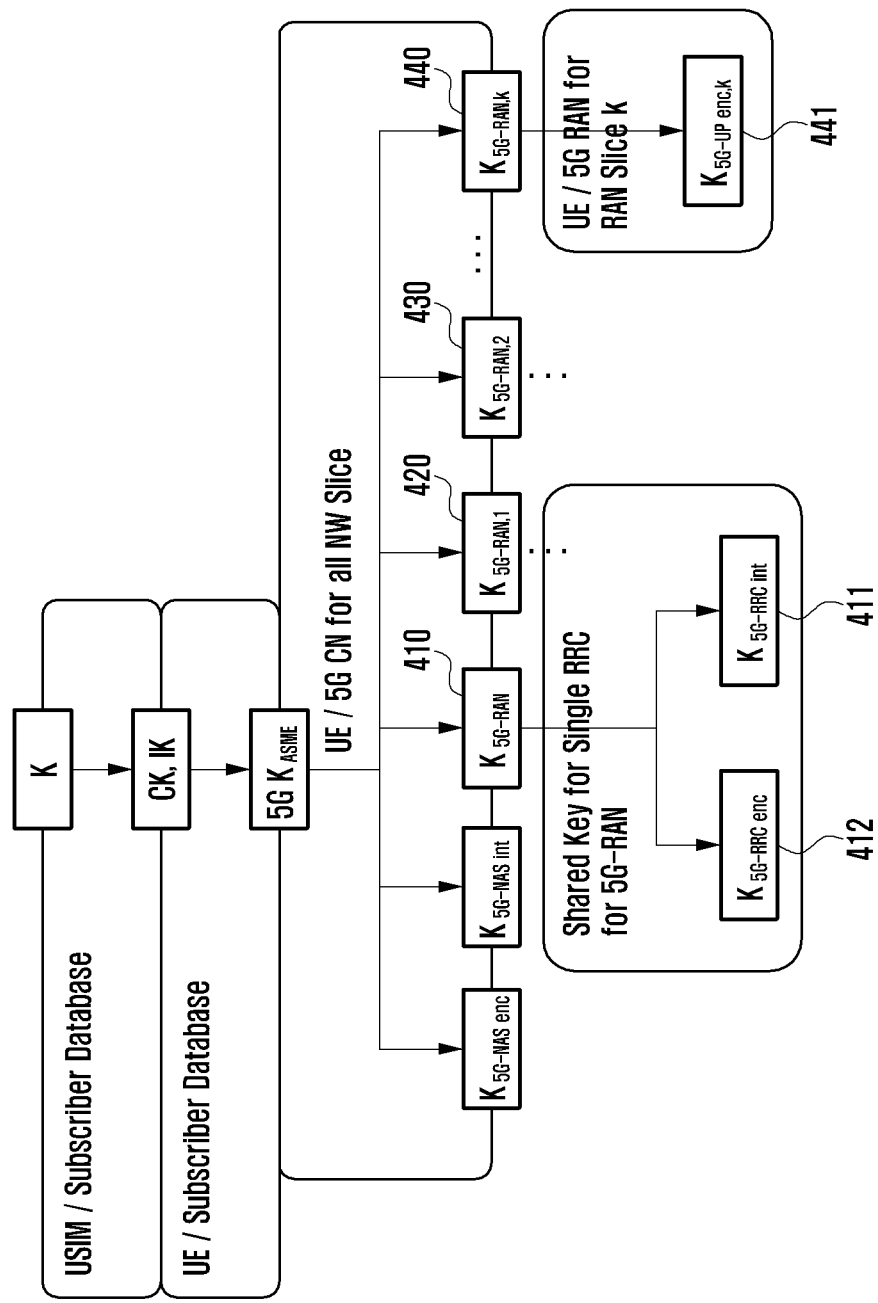

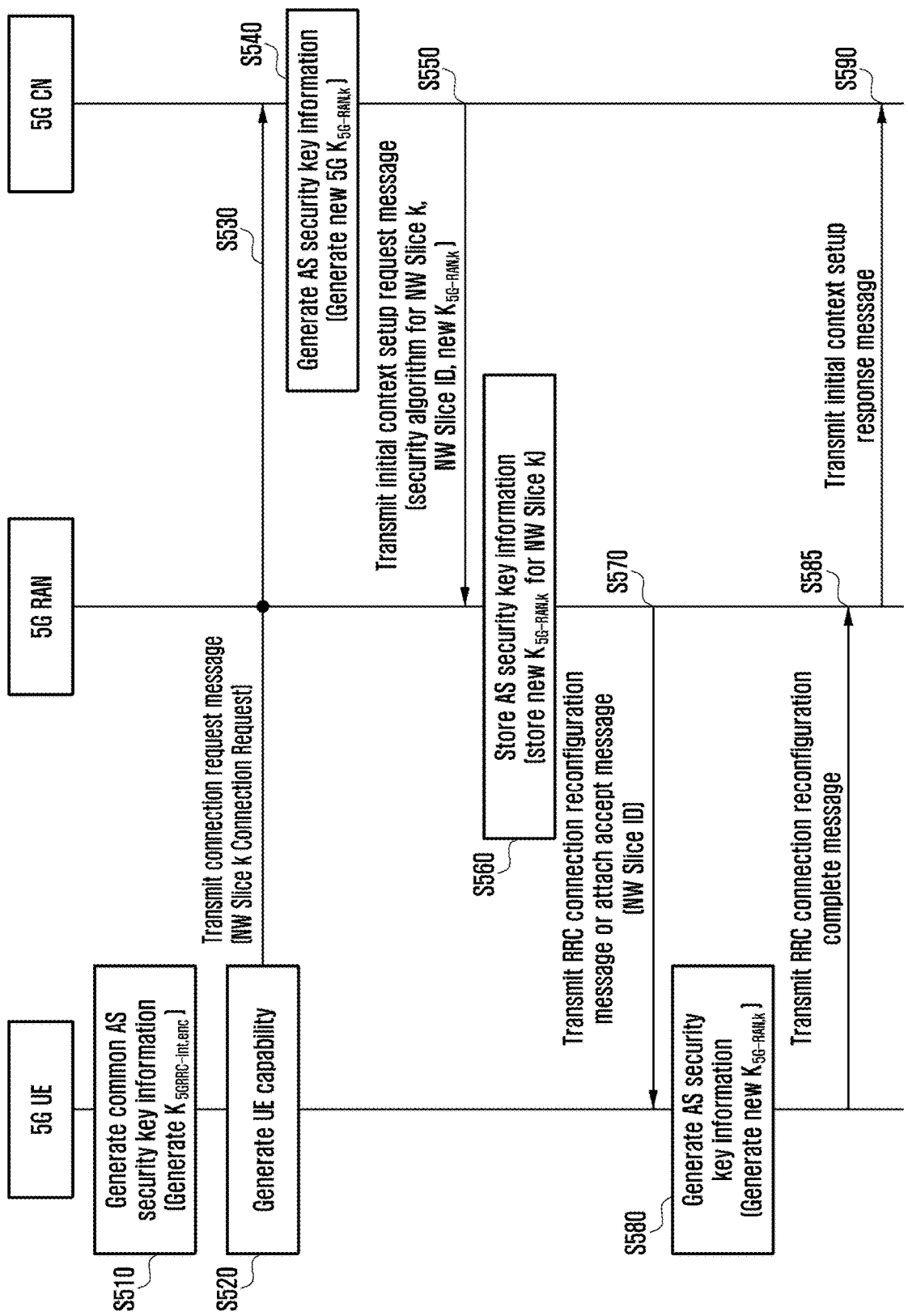

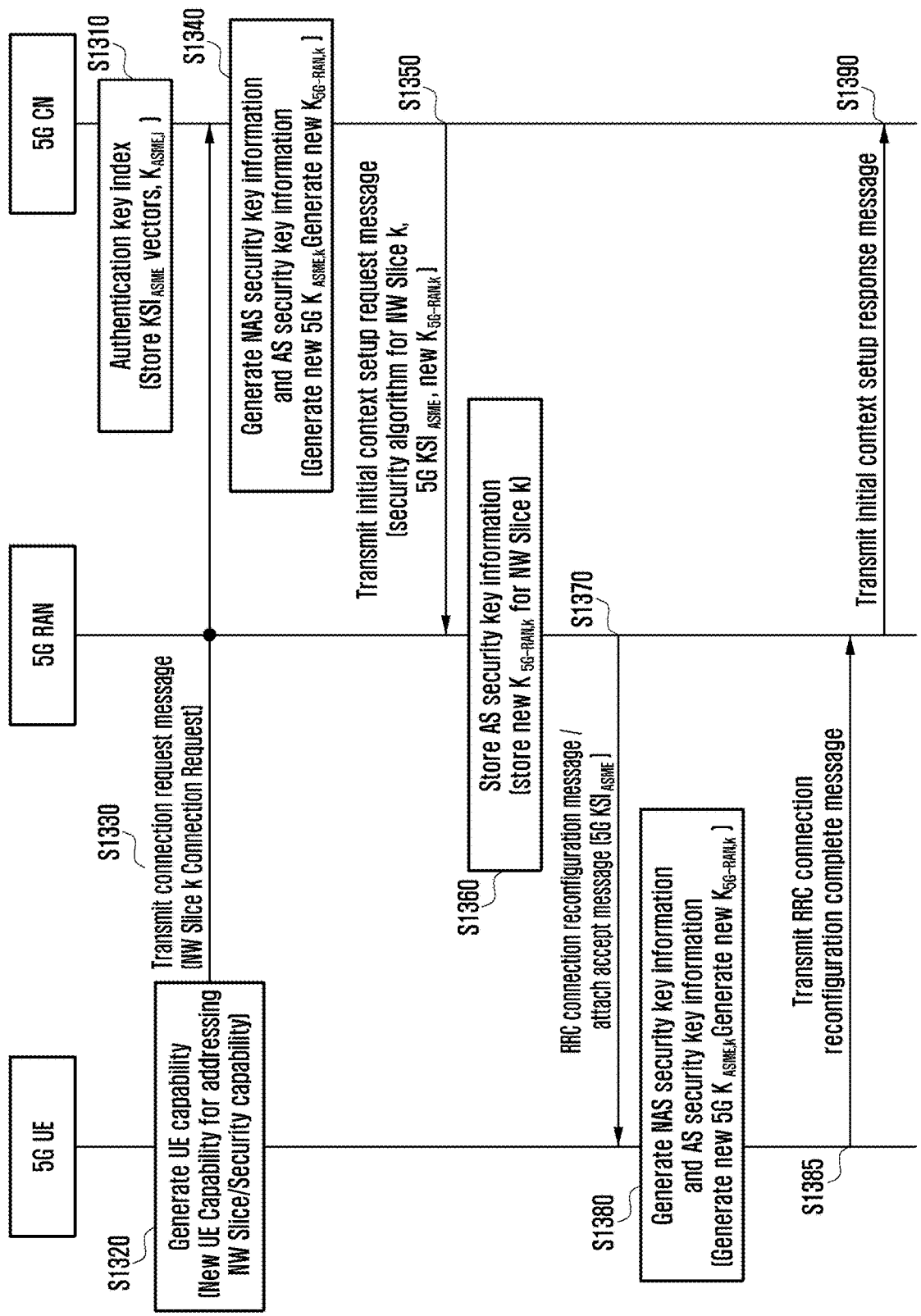

METHOD AND DEVICE FOR MANAGING SECURITY ACCORDING TO SERVICE IN WIRELESS COMMUNICATION SYSTEM

CROSS-REFERENCE TO RELATED APPLICATION

The present application is related to and claims the benefit under 35 U.S.C. § 119(a) of a Korean patent application filed on Jul. 4, 2016, in the Korean intellectual property office and assigned serial no. 10-2016-0084410, the entire disclosure of which is hereby incorporated by reference.

TECHNICAL FIELD

Various embodiments of the present disclosure relate to a wireless communication system, and more particularly, to a method and a device for managing security according to a service.

BACKGROUND

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

Meanwhile, as standardization and development of 5G communication technologies for accommodating new services such as virtual reality (VR) and augmented reality (AR) are accelerated, 5G communication network technologies are being discussed. Currently, one of the core technologies considered as the 5G communication network technologies is a network function virtualization (NFV) technology and network slicing technology utilizing the NFV technology.

However, if the network slicing technology is used, a method for using shared keys for all packet data network (PDN) connections is not suitable for security, and therefore a method for managing new security is needed.

SUMMARY

To address the above-discussed deficiencies, it is a primary object of the present disclosure to direct the provision of a method for adaptively managing security according to a service by using different security keys for each service.

Embodiments of the present disclosure are directed to the provision of a method for adaptively managing security according to a service by using security algorithms for each service.

Objects of the present disclosure are not limited to the above-mentioned objects. That is, other objects that are not mentioned may be obviously understood by those skilled in the art to which the present disclosure pertains from the following description.

Various embodiments of the present disclosure are directed to the provision of a method of a terminal according to the present disclosure comprising: transmitting connection request messages for network slices, which are networks constructed for each service, to a network; receiving response messages including identifiers of the network slices from a base station; and generating security contexts for each network slice based on at least one of the identifiers of the network slices and tokens generated during an authentication process with a third party.

Various embodiments of the present disclosure are directed to the provision of a method of a network comprising: receiving connection request messages for network slices, which are networks constructed for each service, from a terminal; generating security contexts for each network slice based on at least one of identifiers of the network slices and tokens generated during an authentication process with a third party; and transmitting messages including the security contexts generated for each network slice to the base station.

Various embodiments of the present disclosure are directed to the provision of a method of a base station comprising: receiving a setup request message including a generated security contexts from a network based on at least one of identifiers of network slices, which are networks constructed for each service, and tokens generated during an authentication process with a third party; transmitting a connection response message including the identifier of the network slice; and transmitting or receiving at least one of data or control messages for the network slices by applying the security contexts.

Various embodiments of the present disclosure are directed to the provision of a terminal comprising; a transceiver transmitting or receiving signals to and from other network entities; and a controller transmitting connection request messages for network slices, which are networks constructed for each service, to a network, receiving response messages including identifiers of the network slices from a base station, and generating security contexts for each network slice based on at least one of the identifiers of the network slices and tokens generated during an authentication process with a third party.

Various embodiments of the present disclosure are directed to the provision of a network comprising: a transceiver transmitting or receiving signals to and from other network entities; and a controller receiving connection request messages for network slices, which are networks constructed for each service, from a terminal, generating security contexts for each network slice based on at least one of identifiers of the network slices and tokens generated during an authentication process with a third party, and transmitting messages including the security contexts generated for the network slices to a base station.

Various embodiments of the present disclosure are directed to the provision of a base station comprising: a transceiver transmitting or receiving signals to and from other network entities; and a controller receiving a setup request message including a generated security context from a network based on at least one of identifiers of network slices which are networks constructed for each service and tokens generated during an authentication process with a third party, transmitting a connection response message including the identifiers of the network slices, and transmitting or receiving at least one of data or control messages for the network slices by applying the security contexts.

According to the embodiment of the present disclosure, different security keys and different security algorithms are used for each service based on the method proposed in the present disclosure, thereby enabling the independent management for each service. In addition, it is possible to improve the security level by the method proposed in the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A illustrates a method for generating security keys for each network slice according to an embodiment of the present disclosure;

FIG. 5 illustrates a method for controlling security according to an embodiment of the present disclosure;

FIG. 13 illustrates a method for controlling security according to another embodiment of the present disclosure;

DETAILED DESCRIPTION

Figure 1:
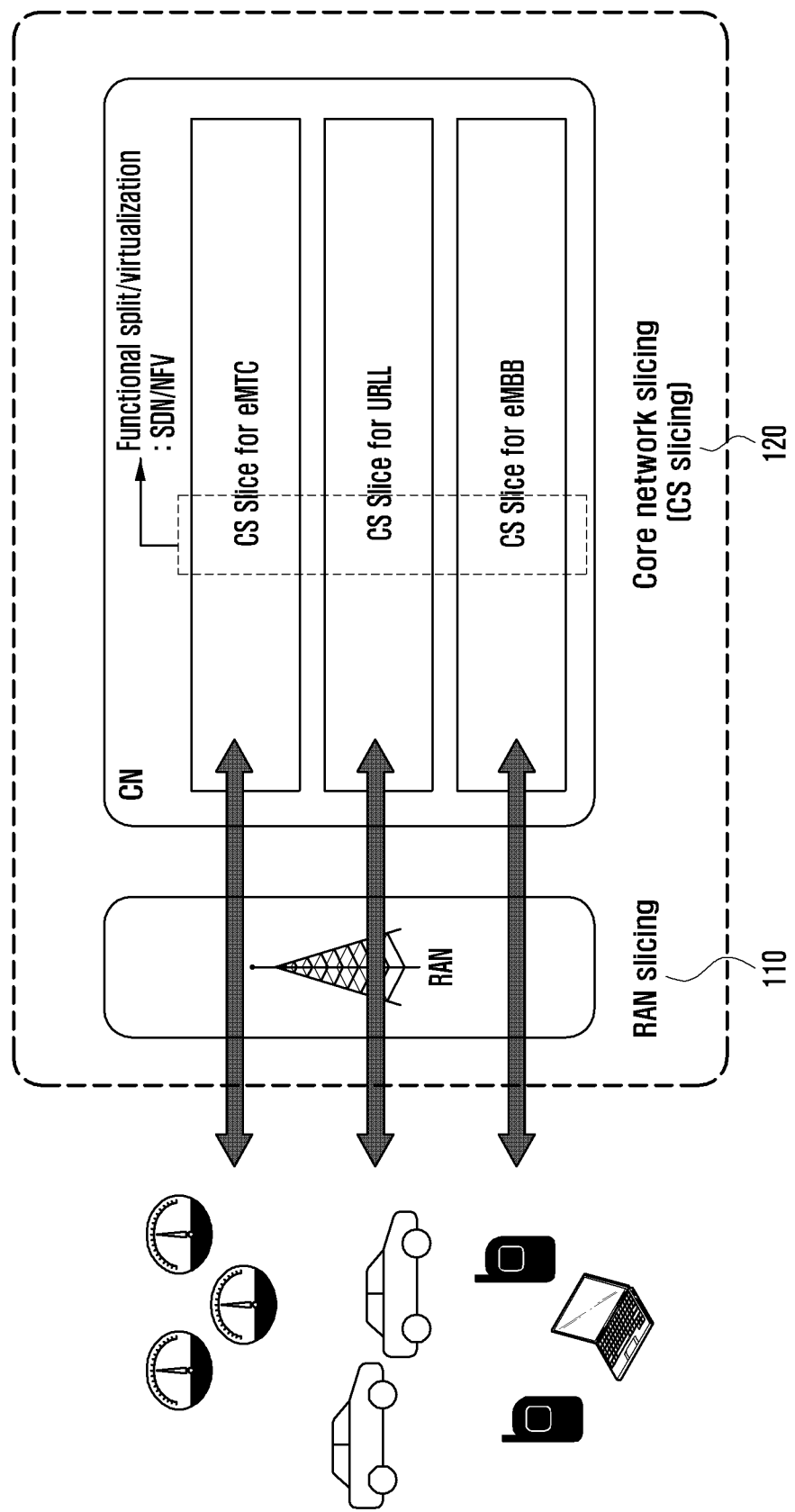
FIG. 1 illustrates a network slicing technology according to the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be substantially simultaneously performed in fact or be performed in a reverse sequence depending on corresponding functions sometimes.

Here, the term "unit" used in the present embodiment means software or hardware components such as FPGA and ASIC and the "unit" performs any roles. However, the meaning of the "unit" is not limited to software or hardware. The "unit" may be configured to be in a storage medium that may be addressed and may also be configured to reproduce one or more processors. Accordingly, for example, the "unit" includes components such as software components, object oriented software components, class components, and task components and processes, functions, attributes, procedures, subroutines, segments of program code, drivers, firmware, microcode, circuit, data, database, data structures, tables, arrays, and variables. The functions provided in the components and the "units" may be combined with a smaller number of components and the "units" or may further be separated into additional components and "~units." In addition, the components and the "units" may also be implemented to reproduce one or more CPUs within a device or a security multimedia card.

FIG. 1 illustrates a network slicing technology according to the present disclosure.

As described above, a core technology considered as 5G communication network technologies is a network function virtualization (NFV) technology and a network slicing technology utilizing the NFV technology.

First, the network function virtualization refers to virtualization of a communication network equipment technology, which has been implemented as existing hardware based dedicated equipment, by software and mounting of the communication network equipment technology on a general-purpose server.

Requirements for each service provided by the network are different. In order to provide optimal services, there is a need to construct an optimal network according to the services. Typically, however, the network was constructed using hardware equipment (for example, mobility management entity (MME), a serving gateway (S-GW) or the like), and therefore it was impossible to construct the optimal network according to services.

However, according to the network virtualization technology, the functions of the communication network equipment may be virtualized by software and mounted on the general-purpose server, such that the same server can perform functions of different network equipments. In this case, if one communication network equipment may perform various functions, the functions of the communication network equipment may be separately implemented or may be implemented by one software.

Therefore, network architecture dependent on the existing hardware based equipment may be dynamically constructed on a service basis by a network function virtualization technology.

Typically, in addition, by providing an interface of the virtualized network function to a third party, the third party can access the communication network equipment which is a black box to provide tight interworking of communication with services.

The technology that has been considered as a core technology when the network function virtualization technology is introduced is a network (NW) slicing technology, and the network slicing technology is as shown in FIG. 1.

The network slicing structure may be configured of a combination of base station slicing (ran slicing) 110 for slicing base station resources and core network (CN) slicing 120 for slicing core network resources.

Therefore, the support of the network slicing (NW slicing) may be made by two slices or may be made by only one slicing.

The core purpose of the network slicing is to quickly introduce 5G services that have various requirements. For example, internet of things (IoT) service, enhanced mobile broadband (eMBB), ultra-reliable and low latency communications (URLLC), massive machine type communications (massive MTC), or the like have different requirements, such that there is a need to operate different networks for each service. In other words, in order to meet the requirements of the 5G services, each service provider needs to operate a separate network for each service, thereby smoothly providing services.

Therefore, the network slicing technology refers to a technology for supporting a logical virtual network by virtualizing the network resource and the network equipment technology as the network virtualization technology by software and dynamically configuring the network resources and the network equipment technology.

That is, instead of constructing a dedicated network for each specific service having different requirements, the network slice, which is logically a virtual network, is assigned to each service in spite of sharing the same hardware infrastructure, such that a user may use network resources satisfying the requirements for each service. The network slice may mean networks constructed for each service. In other words, each of the network slices corresponds to each service.

Currently, the 3GPP is being standardized to actively introduce the network slicing technology into the next generation 5G technology. Since the network slices assigned to each service support independent services, the network slices need to be isolated or separated from each other and operated independently to derive the requirements.

However, the 5G network architecture based on the network slicing uses shared security key information for all PDN connections and does not use a uniform security level and security algorithm. When the same security key is used, an exposure of the corresponding security key means security leakage of all network slices, which may violate an independent operating philosophy. In addition, since each network slice is highly likely to be operated by a third party providing a specific service, the third party is highly likely not to want to provide the uniform security.

Therefore, the next generation 5G communication network requires a scheme of adaptively applying security according to services. The present disclosure provides a method for deriving independent security key information for each network slice and applying and controlling independent security algorithms for each network slice. To support this, the overall modification of the existing 4G LTE security key derivation and control scheme revision may be involved.

Figure 2A:
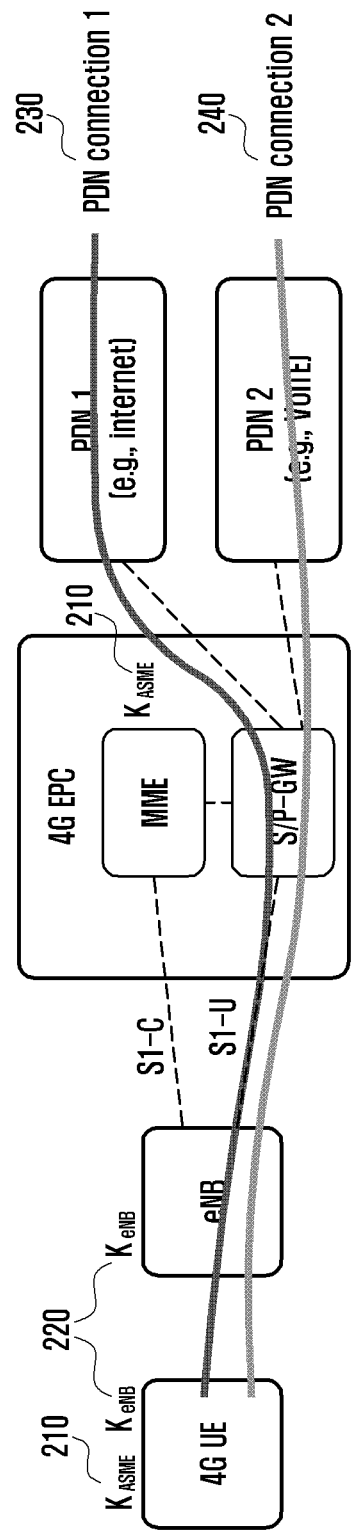
FIG. 2A illustrates a method for providing security using shared security key information for all PDN connections.

FIG. 2A illustrates a method for providing security using shared security key information for all PDN connections.

The terminal, the base station, and the core network can perform authentication using the security key information. Specifically, the terminal and the base station may derive access stratum (AS) security key information ($K_{eNB}$) 220 through non-access stratum (NAS) security key information ($K_{ASME}$) 210 that is issued by authentication during an initial access. Therefore, the base station and the terminal can use the AS security key information as an authentication key for authenticating the AS. The specific procedure for generating the NAS security key information and the AS security key information will be described with reference to FIG. 2B.

Figure 2B:
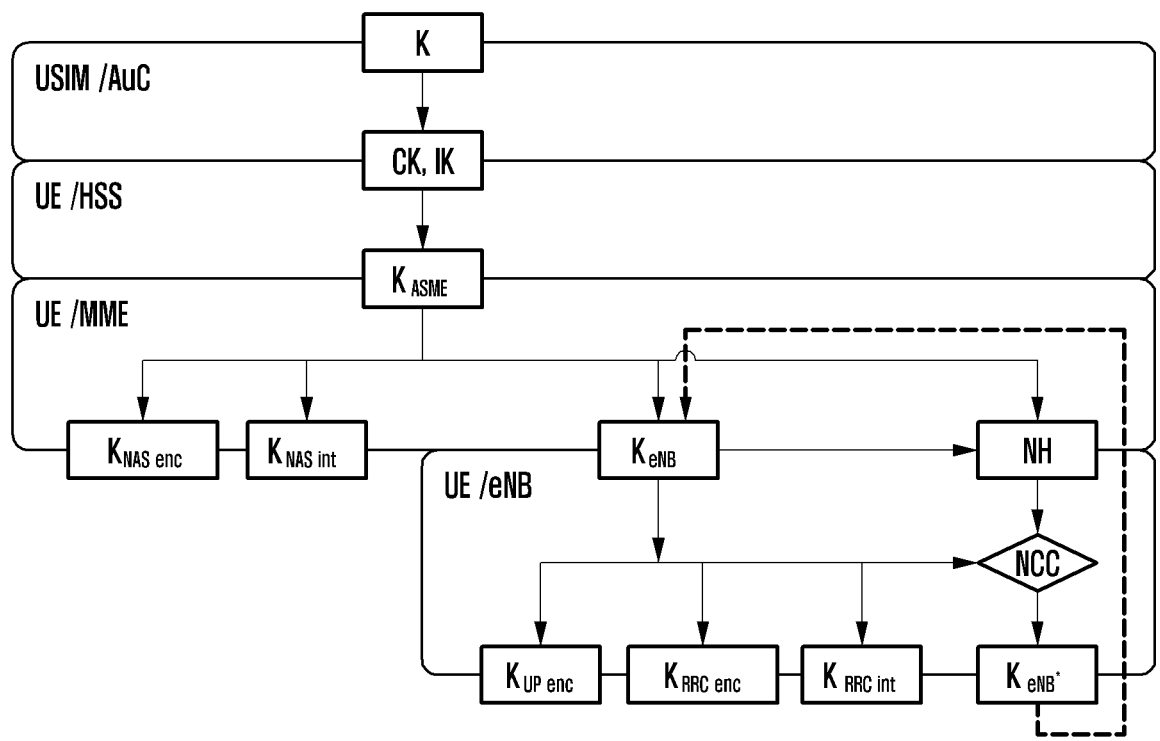
FIG. 2B illustrates a process of generating security key information according to the present disclosure.

FIG. 2B illustrates a process of generating security key information according to the present disclosure.

A user's universal subscriber identification module (USIM) and a home subscriber server (HSS) may store a user-specific key K and user's international mobile station identity (IMSI). In this case, the K value may mean a value corresponding to the user's IMSI value.

The terminal and the HSS may use the K value to derive two security keys CK and IK. Furthermore, the terminal and the HSS may use the derived security keys CK and IK to generate the NAS security key information $K_{ASME}$. Therefore, the terminal and the MME may use the NAS security key information generated from the $K_{ASME}$ after mutual authentication to generate key information $K_{NAS\ int}$ for integrity verification and key information $K_{NAS\ enc}$ for encryption, in which the message between the terminal and the MME may be integrity protected and encrypted using the key information $K_{NAS\ int}$ for integrity verification and key information $K_{NAS\ enc}$ for encryption that are generated by the NAS security key information.

Meanwhile, the terminal and the MME may use the NAS security key information to generate the AS security key information $K_{eNB}$. The MME may transmit the AS security key information to the base station, and the terminal and the base station may use the AS security key information to generate key information $K_{RRC\ int}$ for integrity verification and key information $K_{RRC\ enc}$ for encryption for control messages that are transmitted or received between the terminal and the base station, in which the control message may be integrity protected and encrypted using the key information. Furthermore, the terminal and the base station may use the AS security key information to generate key information $K_{UP\ enc}$ for encrypting data transmitted or received between the terminal and the base station, in which the data can be encrypted using the key information.

Referring back to FIG. 2A, the NAS security key information ($K_{ASME}$) 210 and the AS security key information ($K_{eNB}$) 220 are identically shared even when an additional PDN connection is generated, and the terminal, the base station, and the core network may use the same security key information and algorithm to perform authentication.

For example, referring to FIG. 2A, a PDN connection 1 230 for providing an Internet service and a PDN connection 240 for providing a VoLTE service may be established between the terminal, the base station, and the core network.

At this point, the NAS security key information 210 and the AS security key information 220 may be used for the PDN connection 1 230 and the PDN connection 2 240 in the same manner.

However, as described above, a method for applying the same security key and security algorithm to all PDN connections may have a problem in supporting a network slicing technology. Since each network slice is independently operated by other service providers and even security levels required to provide services for each network slice are also different, a method for providing security according to services is needed.

Figure 2C:
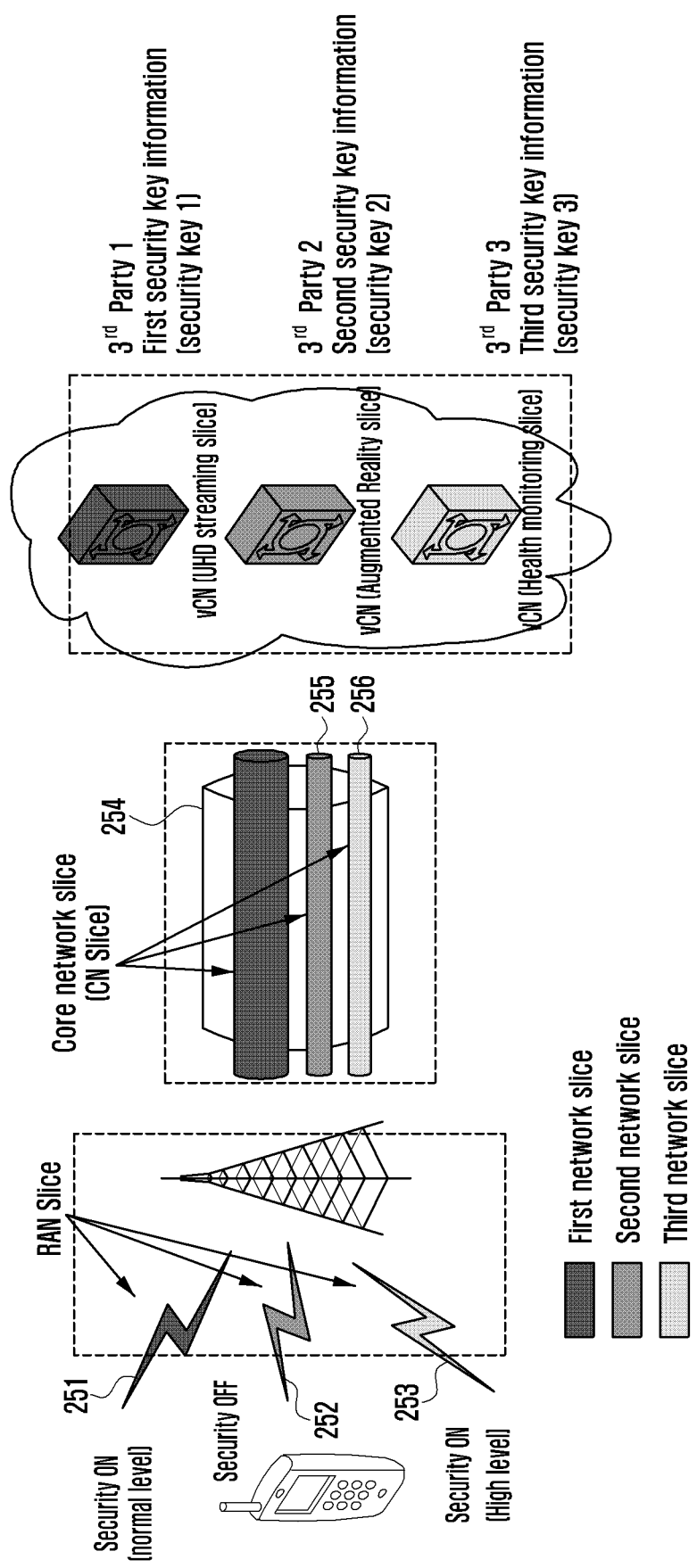
FIG. 2C illustrates a network slicing structure according to an embodiment of the present disclosure.

FIG. 2C illustrates a network slicing structure according to an embodiment of the present disclosure.

As described above, the present disclosure relates to a method for adaptively applying security according to services in 5G network architecture based on a network slicing technology.

Referring to FIG. 2C, three different RAN slices 251, 252, and 253 may exist between the terminal and the base station. Further, there may also be three different core network slices 254, 255, and 256 even between the base station and the core network. According to the present disclosure, the network slice may be composed of a RAN slice and a core network slice.

For example, the base station slice 251 and the core network slice 254 may configure a first network slice, the base station slice 252 and the core network slice 255 may configure a second network slice, and the base station slice 253 and the core network slice 256 may configure a third network slice. FIG. 2C describes an example in which three network slices are set, but the scope of the present disclosure is not limited thereto. That is, the number of network slices may be changed.

Firstly, an object of the present disclosure may provide a method for applying different security levels for each network slice and setting on or off of a security procedure.

If the security procedure is performed, latency may occur due to a security processing delay, and battery consumption may increase due to security procedure power processing power. Thus, if an excessive security procedure is performed for a service requiring low latency (e.g., URLL service) or a service requiring low latency, low power consumption (e.g., glass type AR equipment) or the like, there may be a problem in providing the services.

Accordingly, it is possible to provide appropriate security according to types of services provided by the network slice by setting on or off of the security procedures for each network slice and applying different security levels thereto.

For example, referring to FIG. 2C, the first network slice is a network for providing a UHD streaming service, and the terminal may turn on the security procedure for the first network slice and apply normal level security.

On the other hand, the second network slice is a network for providing augmented reality, and the terminal may turn off the security procedure for the second network slice.

In this way, the terminal may turn on or off the security procedures for each network slice and apply different security levels.

Secondly, according to the present disclosure, it is possible to provide a method for operating independent security key information for each network slice. As described above, since the network slice may be operated by the third party, when the network slice uses the same security key information, if the security key information of a specific network slice is exposed, it may affect securities of other network slices. Therefore, according to the present disclosure, it is possible to provide a method for operating independent security key information for each network slice.

For example, referring to FIG. 2C, the first security key information (security key 1) may be used for the first network slice, and the second security key information (security key 2) may be used for the second network slice. In this way, the present disclosure can strengthen the security of the network slice by operating the independent security key information.

Figure 3:
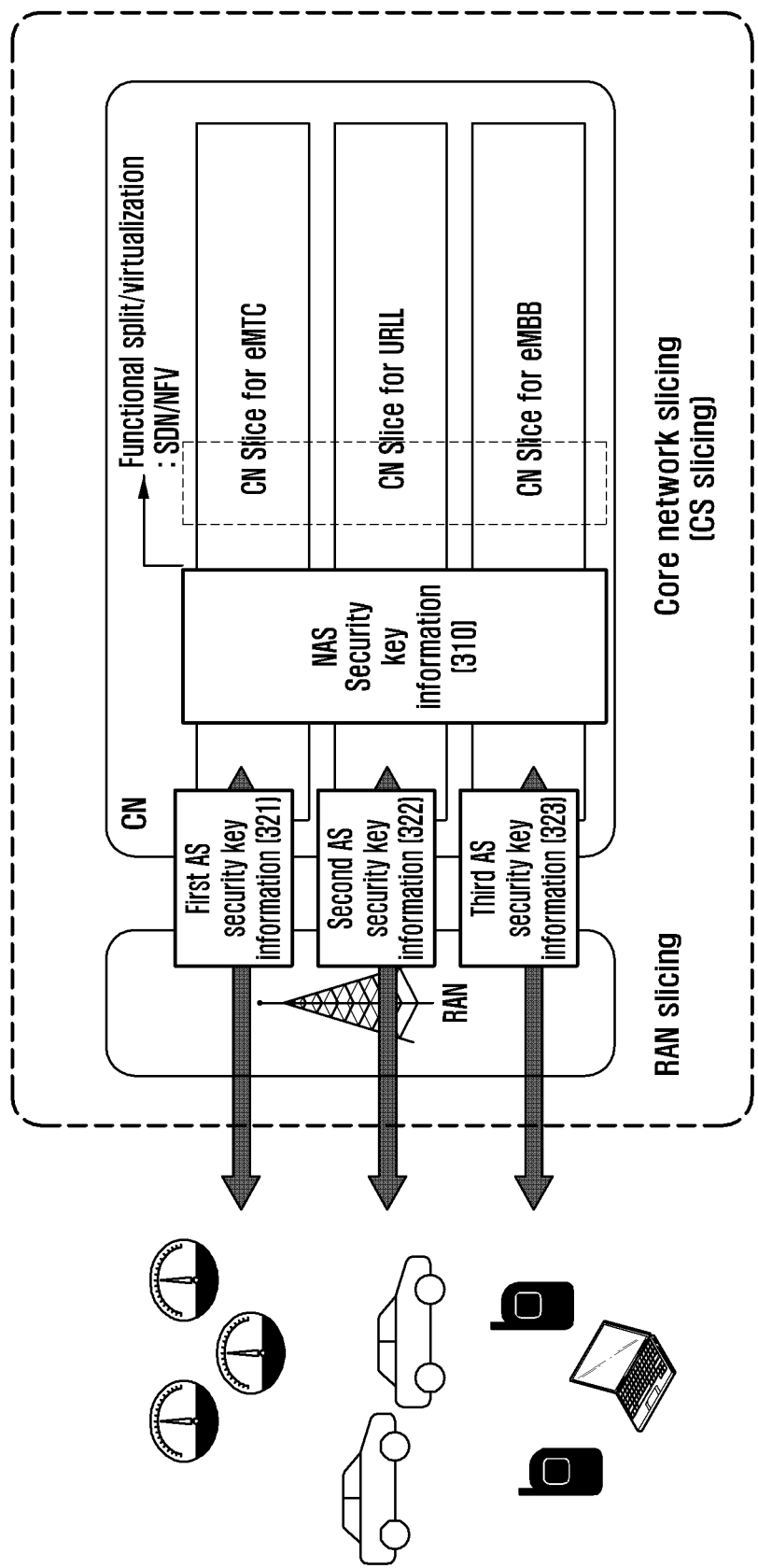
FIG. 3 illustrates a network architecture according to an embodiment of the present embodiment.

FIG. 3 illustrates network architecture according to an embodiment of the present disclosure.

In the following description of the present disclosure, the content of the present disclosure will be described with reference to a terminal for convenience of explanation. However, the embodiment of the present disclosure is not limited thereto, and the contents of the present disclosure can be applied to the terminal, the base station, and the core network, respectively.

FIG. 3 illustrates a case where the network slice includes a single NAS connection and a plurality of AS connections. Furthermore, in FIG. 3, the plurality of AS connections may share a single radio resource control (RRC) connection.

The network architecture of FIG. 3 is architecture that unifies all control entities and multiplexes user plane entities to minimize signaling due to a control.

Referring to FIG. 3, since the network slice includes the single NAS connection, the terminal may use the same NAS security key information 310 for each network slice. Further, since the network slice includes the plurality of AS connections, the terminal may use different AS security key information for each network slice. The present disclosure describes an example in which the AS security key information includes first AS security key information 321, second AS security key information 322, and third AS security key information 333, but the number of AS security key information may be changed.

In this way, an identifier for identifying each network slice (hereinafter, the term network slice identifier, NW slice ID may be used) may be used to generate different AS security key information for each network slice. That is, the network slice identifier may be used as an input parameter to derive the AS security key information.

At this time, the terminal may use any of the following methods to generate the security key information using the network slice identifier.

Firstly, the terminal may generate the security key information using a permanent network slice identifier (permanent NW slice ID). For example, when the network slice is first registered, a terminal may be assigned a unique network slice identifier (unique NW slice ID) that may be identified within a service provider network or globally. The network slice identifier may be stored in HSS, and the terminal may receive the network slice identifier during the initial access procedure and use the received network slice identifier to generate security keys for each network slice.

Secondly, the terminal may generate the security key information using a temporary network slice identifier (temporary NW slice ID). When the network slice connection is generated, a random value capable of temporarily identify the network slice within a mobile network operation (MNO) may be assigned. Accordingly, the terminal may generate security keys for each network slice using the temporary network slice identifier.

In addition, the terminal may use a token (or authentication vector or authentication key) generated in the authentication process with the third party to generate the security key information. Specifically, when the network slice is driven by the third party, intra-network authentication may not only be performed at the network slice, but additional authentication may also be performed at each third party operating the network slice.

The token may be generated while the terminal performs the additional authentication at the third party, and the terminal may generate the security key information for each network slice using the token. Furthermore, the terminal may generate the security key information for each network slice by combination with the authentication key generated after performing the intra-network authentication using the token.

In addition, as described above, the present disclosure may provide a method for independently operating security algorithms for each network slice. For example, the terminal may not apply security to the first network slice, and may apply security to the second network slice. That is, the terminal may set securities for each network slice.

In addition, according to the present disclosure, the terminal can apply different security policies (or security setup information) for each network slice. Accordingly, the core network may notify the base station (RAN) of different security policies for each network slice. The security policy may include, for example, security on or off or the like.

The network may operate according to the security policy determined at the initial connection, and change the security policies for each network slice later. Therefore, the core network may notify the base station of the changed security policy for each slice. The detailed content thereof will be described below.

FIG. 4A illustrates a method for generating security keys for each network slice according to an embodiment of the present disclosure.

Referring to FIG. 4A, the terminal and the HSS may use the user specific key K and the security keys CK and IK derived from the user specific key K to generate the NAS security key information. In addition, the terminal and the core network may use the NAS security key information to generate the key information $K_{NAS\ int}$ for integrity verification and the key information $K_{NAS\ enc}$ for encryption. The detailed operation thereof is similar to one described in FIG. 2B and therefore the description thereof will be omitted.

Meanwhile, the terminal may use the NAS security key information to generate common AS security key information ($K_{5G-RAN}$) 410. The common AS security key may refer to a security key, which is commonly applied, to support one RRC connection.

Therefore, a common AS security key may be used for control messages that are transmitted or received between the terminal and the base station for all network slices. Specifically, the terminal may use the common AS security key to generate key information ($K_{5G-RRC\ int}$) 411 for integrity verification and key information ($K_{5G-RRC\ enc}$) 412 for encryption for control messages that are transmitted or received between the terminal and the base station. Therefore, the control messages that are transmitted or received between the terminal and the base station may be integrity protected and encrypted by the key information.

Meanwhile, the terminal may generate independent AS security key information $K_{5G-RAN,\ k}$ for each network slice to implement security of data transmitted or received between the base station and the terminal. If k network slices are set in the network, the AS security key information includes first AS security key information 420, second AS security key information 430, ..., and k-th AS security key information 440.

Accordingly, the terminal may use the AS security key $K_{5G-RAN,\ k}$ for a network slice k to generate security key information ($K_{5G-UP\ enc,\ k}$) 441 for encrypting data transmitted or received by the terminal and use the security key information to encrypt the data.

At this time, in order to generate the independent AS security key information for each network slice, the terminal may apply a network slice identifier as an additional input value from the common AS security key information to generate the independent AS security key information.

Figure 4B:
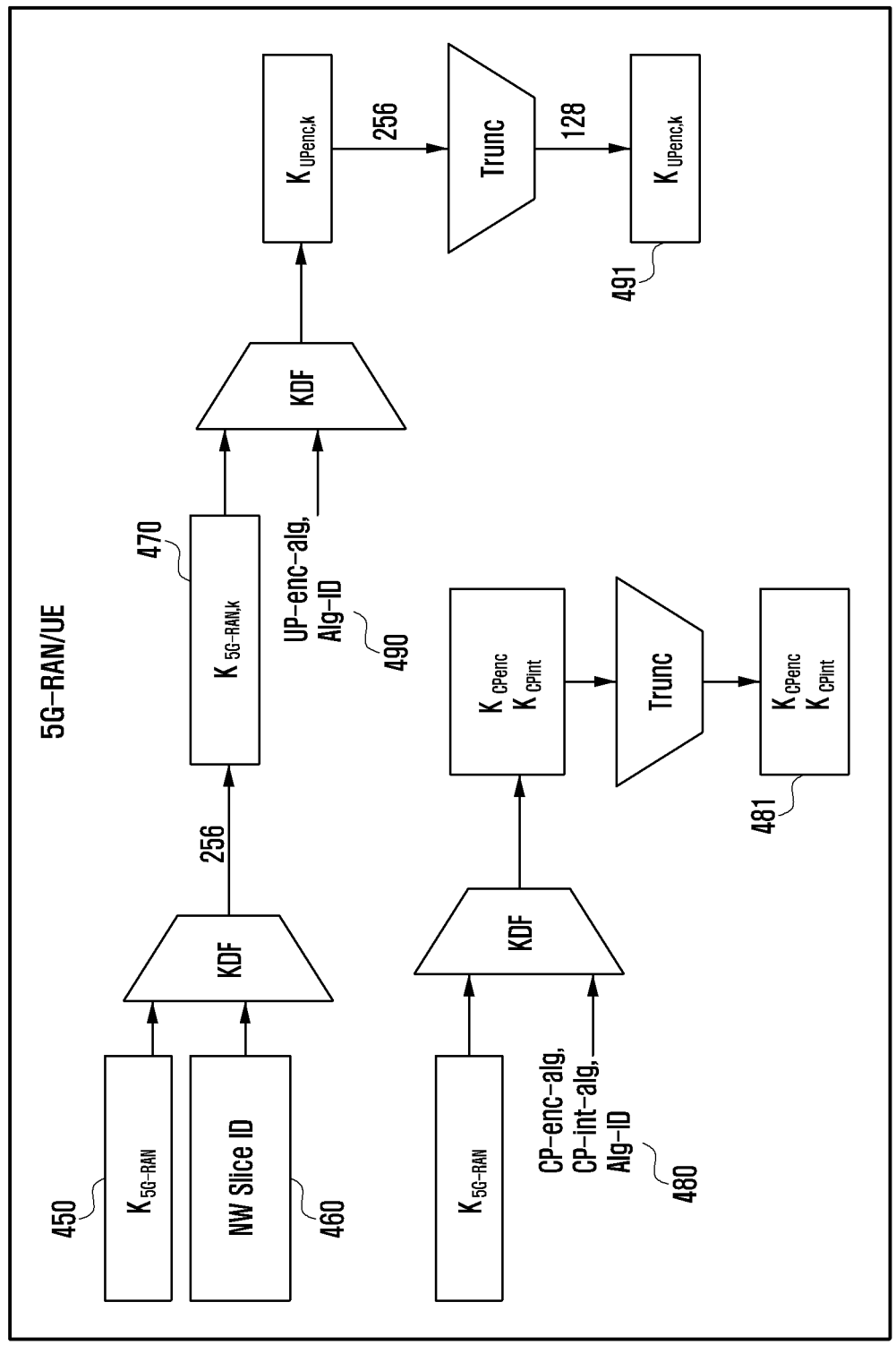
FIG. 4B illustrates a method for generating security keys for each network slice according to the embodiment of the present disclosure.

FIG. 4B illustrates the detailed method for generating security keys for each network slice according to the embodiment of the present disclosure.

As described above, the terminal may use the NAS security key information to generate common AS security key information 450 $K_{5G-RAN}$. The common AS security key may refer to a security key, which is commonly applied, to support one RRC connection.

Therefore, the common AS security key may be used for control messages that are transmitted or received between the terminal and the base station for all network slices. Specifically, the terminal may use the common AS security key information ($K_{5G-RAN}$) 450 to generate key information $K_{CPint}$ for integrity verification and key information ($K_{CP\ enc}$) 481 for encryption for control messages that are transmitted or received between the terminal and the base station. At this time, the common AS security key information ($K_{5G-RAN}$) 450 may be used as an input parameter for integrity verification and encryption for control messages together with a control plane algorithm 480. That is, the terminal may apply the control plane algorithm to the common security key to generate key information $K_{CPint,\ k}$ for integrity verification and key information ($K_{CP\ enc,\ k}$) 481 for encryption for control messages.

Meanwhile, for the security of data transmitted or received between the base station and the terminal, the terminal may use the common AS security key information ($K_{5G-RAN}$) 450 to generate the AS security key information $K_{5G-RAN,k}$. The terminal may use the AS security key information $K_{5G-RAN,\ k}$ to manage the security for data transmitted or received for each network slice.

At this time, the terminal may use a network slice identifier 460 as an input value in addition to the common AS security key information ($K_{5G-RAN}$) 450 to generate the independent AS security key information for each network slice.

The terminal may input the common AS security key information 450 and the network slice identifier 460 to acquire the AS security key information ($K_{5G-RAN,\ k}$) 470 and use the AS security key information ($K_{5G-RAN,\ k}$) 470 as the input parameter for encryption for data together with a data plane algorithm 490. That is, the terminal may apply the data plate algorithm 490 to the AS security key information ($K_{5G-RAN,\ k}$) 470 to generate key information ($K_{Upenc,k}$) 491 for encryption for data.

FIG. 5 illustrates a method for controlling security according to an embodiment of the present disclosure.

Referring to FIG. 5, the terminal may generate the common AS security key $K_{5G-RAN}$ in step S510, and may use the common AS security key to generate key information $K_{5G-RRC\ int}$ for integrity verification and key information $K_{5G-RRC-enc}$ for encryption (generate $K_{5G-RRC-Int,\ enc}$). The steps prior to the generating of the common AS security key are similar to those described above, and therefore are omitted in the present disclosure.

In step S520, after generating the common AS security key, the terminal may generate UE capability. At this time, the UE capability generated by the terminal may include network slice information and security capability (new UE capability for addressing NW slice or security capability).

The network slice information includes a network slice indicator indicating a type of network slices (for example, what type of service the network slice is mapped to), information related to the number of network slices set in the terminal, identifier information of the network slice or the like.

In addition, the security capability may include information related to a security algorithm, information related to a security level, information related to security levels for each network slice, and security algorithm information depending on the security levels or the like.

The terminal may notify the network of all the security algorithm information that can be supported by the terminal during the initial access and may use specific algorithms determined for each network slice according to the network selection.

Thereafter, in step S530, the terminal may transmit connection request messages for each network slice to the core network (NW slice k connection request). The terminal may transmit the connection request messages to the core network to access the networks for each service. The connection request message may include the UE capability.

In addition, the connection request message may include, for example, a PDN connection request message. The terminal may transmit at least one connection request message to the core network to access at least one network slice. Alternatively, the terminal may transmit at least one connection request message to the core network to access at least one network slice.

In step S540, the core network receiving the connection request message may generate the AS security key information $K_{5G\text{-}RAN, k}$. At this time, the core network may use the received network slice identifier to generate the AS security key information $K_{5G\text{-}RAN, k}$ (using NW slice ID, generate new $K_{5G\text{-}RAN}$).

Further, in step S550, the core network may transmit an initial context setup request message to the base station 5G RAN.

The initial context setup request message may include a security context for the network slice. The security context may include at least one of information related to the security algorithm, the network slice identifier information, and the AS security key information $K_{5G\text{-}RAN, k}$.

As described above, according to the present disclosure, different security levels may be applied to each network slice. Accordingly, different algorithms may be applied to each network slice, and the core network may transmit the security algorithm information to be used for the network slice to the base station by including the security algorithm information in the initial context setup request message.

The base station may generate the key information for encryption for data using the security algorithm related information and the AS security key information $K_{5G\text{-}RAN, k}$ received for each network slice, and uses the generated key information to encrypt data transmitted or received to or from the terminal.

In step S560, the base station receiving the initial context setup message may store the AS security key information $K_{5G\text{-}RAN, k}$. The base station receiving the initial context setup message may store the AS security key information $K_{5G\text{-}RAN, k}$ for the network slice k.

Next, in step S570, the base station may transmit RRC connection reconfiguration message (5G RRC connection reconfiguration) or attach accept message to the terminal as a response to the connection request message of the terminal. At this point, the RRC connection reconfiguration message or the attach accept message may include the network slice identifier set by the terminal. Further, the RRC connection reconfiguration message or the attach accept message may include a network slice counter (NW slice counter). In addition, if a permanent network slice identifier is used, the network identifier may be stored in the terminal, and the base station may not include the network slice identifier in the RRC connection reconfiguration message or the attach accept message. However, the present disclosure is not limited thereto, and the permanent network slice identifier may also be received from the base station.

In step S580, the terminal receiving the RRC connection reconfiguration message or the attach accept message may use the network slice identifier to generate a security context. That is, the terminal may use the network slice identifier to generate the AS security key information $K_{5G\text{-}RAN, k}$ and verify the security algorithm to be used to generate the security context.

Accordingly, the terminal and the base station can apply security to control messages and data using the security context.

Further, in step S585, the terminal may transmit an RRC connection reconfiguration complete message (5G RRC connection reconfiguration complete) to the base station. In step S590, the base station receiving the RRC connection reconfiguration complete message may transmit an initial context setup response message to the core network.

Meanwhile, as described above, the present disclosure can determine whether to apply a security procedure to each network slice (whether the security procedure is turned on or off). At this time, the terminal or the core network may request security application to each network slice, and the detailed content thereof will be described below.

Figure 6:
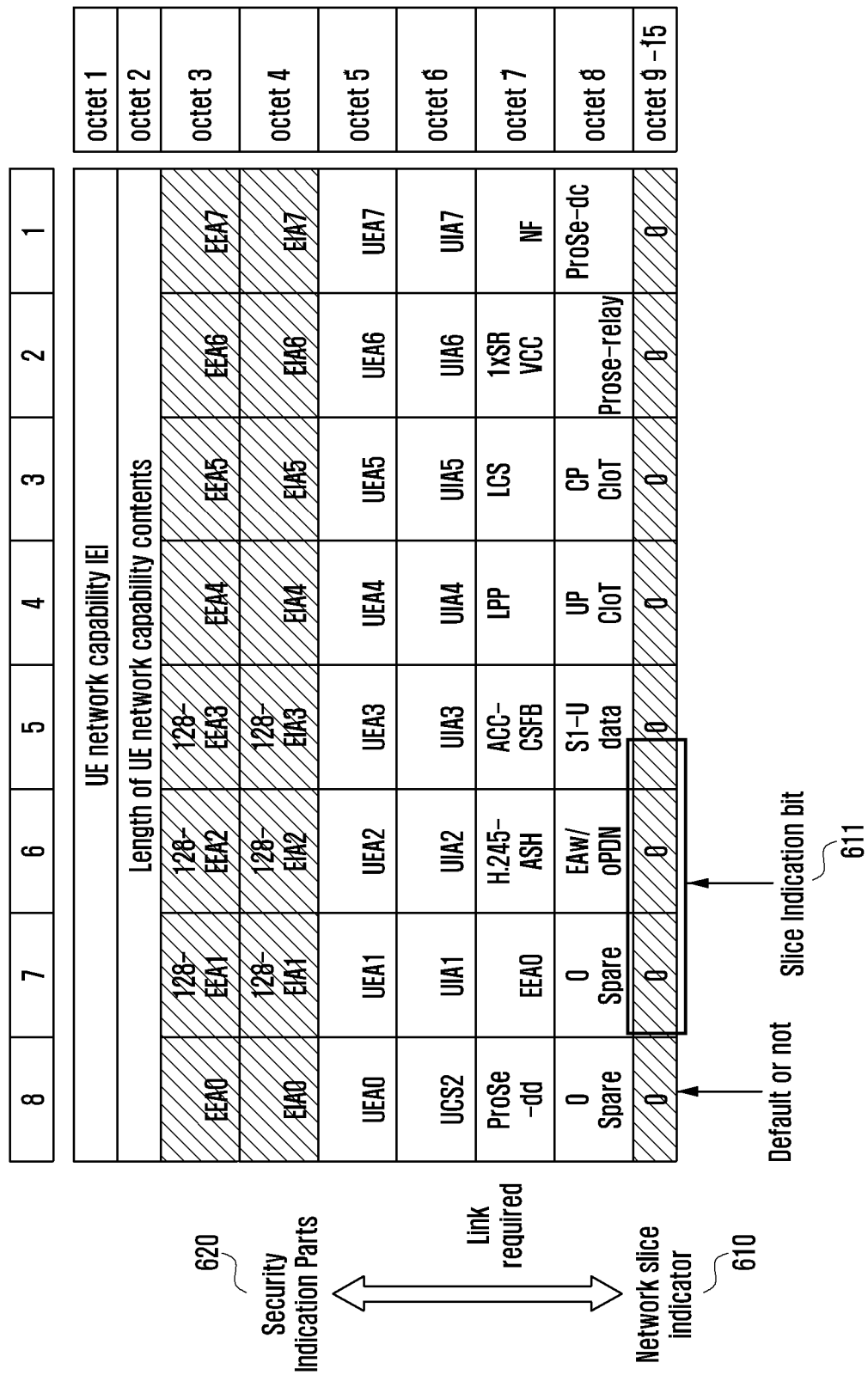
FIG. 6 illustrates a method for allowing a terminal to request a start of security procedures for each network slice according to an embodiment of the present disclosure.

FIG. 6 illustrates a method for allowing a terminal to request a start of security procedures for each network slice according to an embodiment of the present disclosure.

A first method for turning on or off a security procedure for each network is a method for allowing a terminal to determine a security algorithm and to request to start a security procedure (UE initiated). Accordingly, when performing the connection request, the terminal may use a new format for notifying a network slice indicator and a security algorithm.

Referring to FIG. 6, FIG. 6 illustrates UE network capability improving the existing UE capability to notify the network slice indicator and the security algorithm.

In the UE network capability, the network slice indicator indicating a network slice type (e.g., slice mapped to an eMBB or slice mapped to URLL) indicating to which service type the network slice is mapped may be newly defined in a spare part.

Specifically, the network slice indicator may include an extension bit and a slice indication bit, and may indicate the network slice type through the slice indication bit.

For example, the UE network capability may be defined as shown in Table 1 below.

In addition, the UE network capability may include information on a security algorithm applicable to the corresponding network slice type.

For example, the information on the network slice indicator and the security algorithm included in the UE network capability may be defined as shown in Table 1 below.

TABLE 1

Example of NW Slice indication. Use (3bit of Spare Parts)

| Extension bit: Default or not (0, 1)<br>Default Slice (Internet): 00<br>eMBB Slice: 01<br>eMTC Slice: 10<br>Augment Reality Slice: 11 | Link security frameworks for each slice ⬌ | Default Slice (Internet etc): Support LTE<br>Support all Security Algorithms<br>eMBB Slice: NULL or AES<br>MTC Slice: AES<br>Augment Reality Slice: NULL |
|---|---|---|

Referring to the above Table 1, the network slice for providing basic services such as the Internet may be defined as 00, the network slice for providing the eMBB service may be defined as 01, the network slice for providing the eMTC service may be defined as 10, and the network slice for providing the augmented reality service may be defined as 11.

Accordingly, the terminal may construct slice indication bits included in the UE capability according to the established type of network slices and transmit the constructed slice indication bits to the network, and the network may verify the type of network slices established in the terminal.

Also, referring to Table 1, instead of the security algorithm, the AES algorithm may be applied to the network slice for providing the eMBB service, the AES algorithm may be applied to the network slice for providing the MTC service, and the security algorithm may not be applied to the network slice for providing the augmented reality service.

In this way, the terminal can transmit the security algorithm information to be applied to each network slice by including the security algorithm information in the UE capability, and the terminal and the core network can use the security algorithm.

The UE capability can be transmitted from the terminal to the network upon the connection request, and the terminal and the network can apply proper security algorithms to each network slice using the UE capability.

Figure 7:
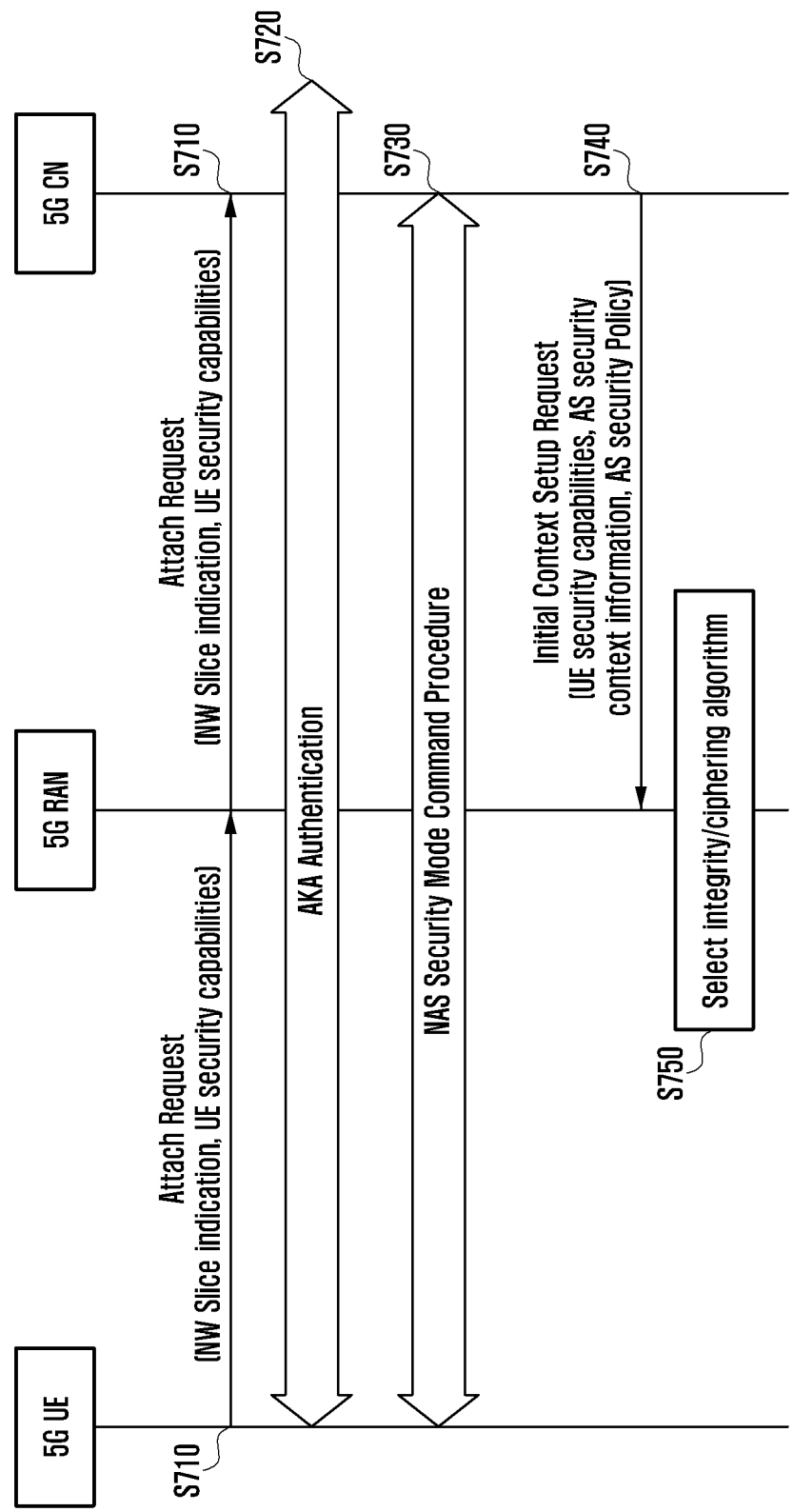
FIG. 7 illustrates a method for allowing a network to request a start of security procedures for each network slice according to an embodiment of the present disclosure.

FIG. 7 illustrates a method for allowing a network to request a start of security procedures for each network slice according to an embodiment of the present disclosure.

Referring to FIG. 7, the network can set on or off of the security procedure for each network slice. In addition, the network can directly request the terminal to modify the security algorithm for each network slice. For this purpose, the core network can notify the AS security policies (for example, security on or off condition, security algorithm modification request) for each network slice to the base station.

Specifically, in step S710, the terminal may transmit an attach request message to the core network through the base station. At this time, the attach request message may include a network slice indicator and UE security capabilities. In addition, the attach request message may include UE NW capability, and the network slice indicator and the security capability may be included in the UE NW capability. However, the scope of the present disclosure is not limited thereto, and the network slice indicator and the security capability of the terminal may include information separate from the UE capability.

Hereinafter, the terminal and the base station core network may perform an AKA authentication procedure in step S720 and may perform a NAS security mode command procedure in step S730. This is the same as contents in the existing LTE, and the detailed content thereof will be omitted.

Thereafter, in step S740, the core network (5G CN) may transmit an initial context setup request message to the base station. The core network may include the security capability and the AS security context information of the terminal in the initial context setup request message, and may transmit the security algorithm that the terminal can support and a base line key to be used in the base station.

Specifically, the security capability of the terminal may include a security algorithm that the terminal can support, and the AS security context information may include the security algorithm to be used by the terminal and the base line key to be used in the base station. Therefore, the terminal and the base station can transmit or receive data and control messages using the information.

Further, the core network can transmit AS security policies that include security policies for each network slice. At this time, the AS security policy may include information related to on or off triggering conditions of the security procedure. For example, the AS security policy may be set to turn off the security procedure if the T-put is degraded due to security processing. Alternatively, the security procedure may be set to be turned off if a battery of the terminal is insufficient. At this time, the base station can receive an indicator indicating that the battery is insufficient from the terminal in order to check whether the battery of the terminal is insufficient.

Further, in step S750, the base station can select the security algorithm to be applied to the network slice using the AS security context information and the security capability of the terminal that are received. Accordingly, the base station can transmit or receive data and control messages by applying the selected security algorithm when turning on the security procedure according to the on or off triggering conditions of the security procedure.

In this way, the base station can decide the turn on or off of the security procedures for each network slice according to the AS security policy established by the core network, and can select the security algorithm.

Therefore, the operation for controlling the on or off of the security procedures for each network slice is required, and the detailed content thereof will be described with reference to FIG. 8.

Figure 8:
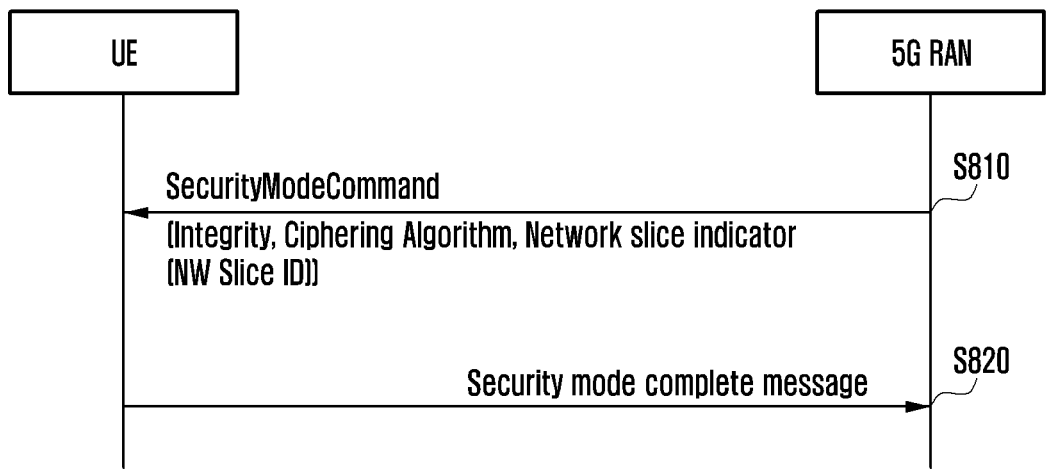
FIG. 8 illustrates a method for controlling on or off of security procedures for each network slice according to an embodiment of the present disclosure.

FIG. 8 illustrates a method for controlling on or off of security procedures for each network slice according to an embodiment of the present disclosure.

The base station can control the on or off of the security procedures for each network slice according to the AS security policy established by the network.

In step S810, the base station may transmit a security mode command (SMC) message to the terminal to turn on or off the security procedure of a specific network slice. At this time, the security mode command message may include the security algorithm (e.g., an algorithm for encryption and integrity protection), and include an identifier of the specific network slice to be controlled. Accordingly, the terminal can apply the security algorithm included in the received message to the network identifier corresponding to the network slice identifier included in the received message.

However, if the security mode command message is a message for turning off the security procedure, the security mode command message may not include the security algorithm or may be set to be a NULL algorithm, and if the received security mode command message does not include the security algorithm, the terminal may turn off the security procedure for the network slice.

Further, the base station may transmit the secure mode command message to the terminal to request the change in the security algorithm of the specific network slice. Accordingly, when receiving the security mode command message, the terminal may change the security algorithm of the network slice corresponding to the network identifier included in the security mode command message to the security algorithm included in the security mode command message and apply it.

In step S820, the terminal receiving the security mode command message may transmit a response message (SecurityModeComplete message) thereto to the base station.

Meanwhile, the present disclosure can also be applied to the security application according to the network slice structure that provides different control unit functions. For example, in the present disclosure, each network slice can construct different protocol layers according to the service type.

Figure 9A:
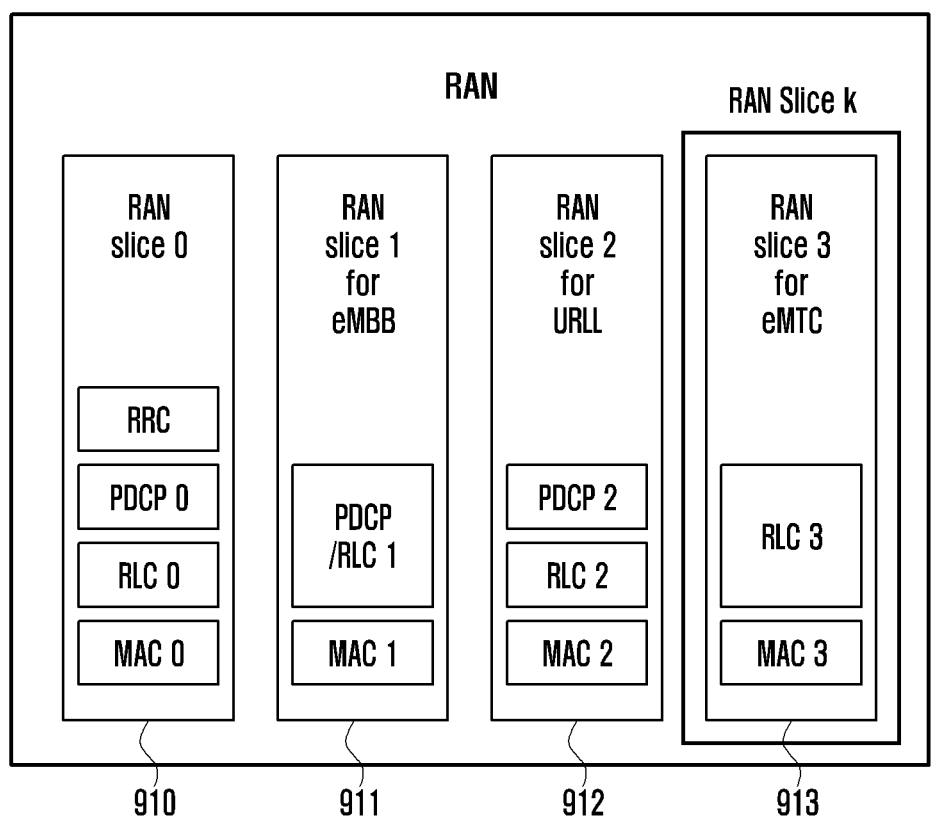
FIGS. 9A and 9B illustrate protocol layers according to service types according to an embodiment of the present disclosure.
Figure 9B:
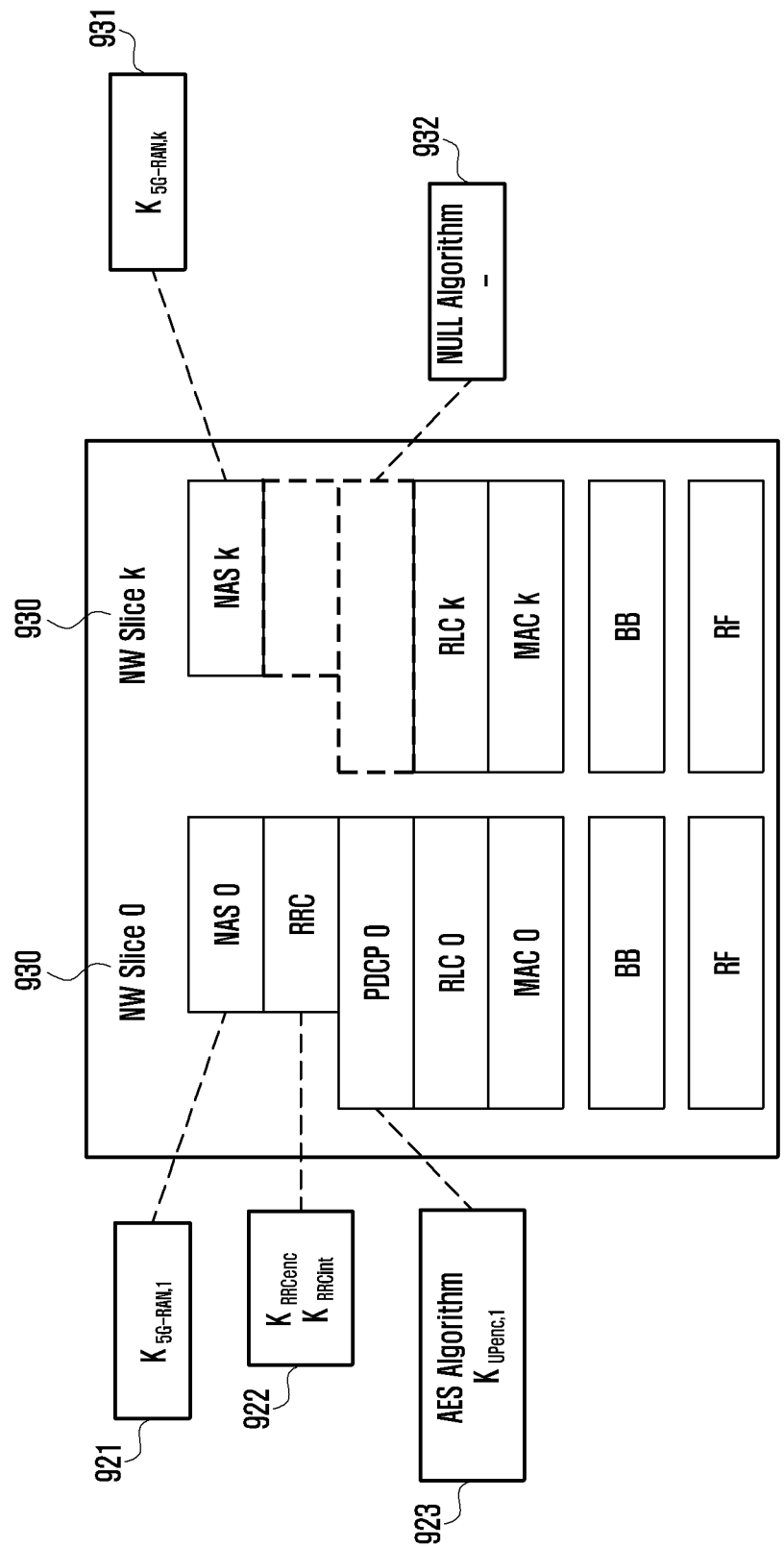

FIGS. 9A and 9B illustrate protocol layers according to service types according to an embodiment of the present disclosure.

Referring to FIG. 9A, different protocol layers may be constructed according to service types. For example, RAN slice 0 can mean a RAN slice for providing basic services such as the Internet. RAN slice 1 may mean a RAN slice for providing an eMBB service. RAN slice 2 may mean a RAN slice for providing an URLL service. RAN slice 3 may mean a RAN slice for providing an eMTC service.

At this time, the RAN slice 0 may include a protocol layer including an RRC layer, a PDCP layer, an RLC layer, and an MAC layer. On the other hand, the RAN slice 1 does not include the RRC layer, and includes the PDCP layer and the RLC layer that may be configured as one layer. Further, the RAN slice 2 may not include the RRC layer, and RAN slice 3 may include only the RLC layer and the MAC layer.

Referring to FIG. 9B, FIG. 9B illustrates a configuration of the protocol layer according to the network slice.

The network slice 0 may include a protocol layer including the NAS layer, the RRC layer, the PDCP layer, the RLC layer, and the MAC layer. Accordingly, the NAS layer may use the NAS security key information $K_{ASME}$ to generate the common AS security key information $K_{5G-RAN}$, and use the common AS security key information $K_{5G-RAN}$ to generate the AS security key information $K_{5G-RAN,1}$ for the network slice 0.

The RRC layer can generate $K_{RRCenc}$ and $K_{RRCInt}$ using the common AS security key information to perform the integrity protection and encryption on the control message.

In addition, in the PDCP layer, the security algorithm may be selected as the AES algorithm, and $K_{Upenc,\ 1}$ may be generated using the $K_{5G-RAN,\ 1}$ to encrypt the data.

On the other hand, the RRC layer and the PDCP layer may not exist in the network slice k. In this way, if the PDCP layer does not exist, the network slice does not need to apply additional security.

Therefore, the base station can acquire the protocol setup information for each network slice and notify the security algorithm depending on the acquired protocol setup information in advance. This can be implemented through the security mode command message described above.

Figure 10:
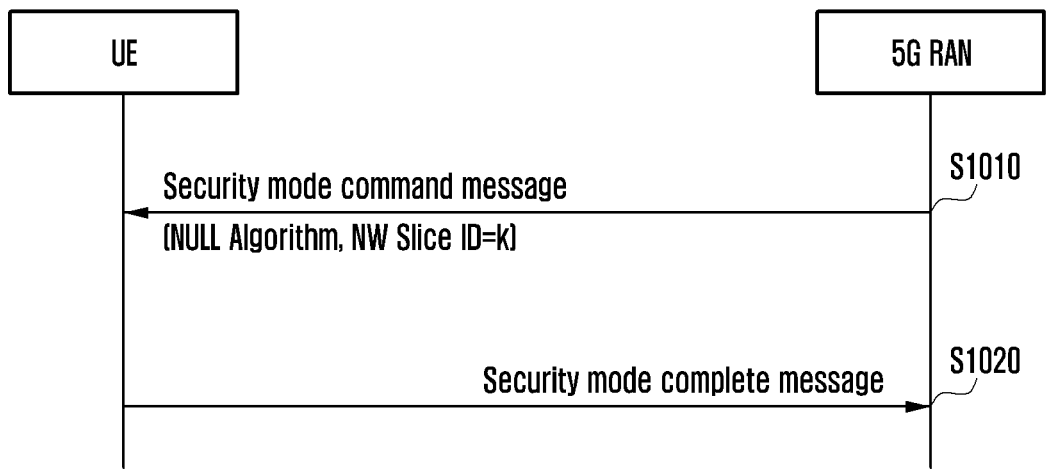
FIG. 10 illustrates a method for transmitting a security algorithm according to a protocol configuration according to an embodiment of the present disclosure.

FIG. 10 illustrates a method for transmitting a security algorithm according to a protocol configuration according to an embodiment of the present disclosure.

Referring to FIG. 10, when the terminal requests the network slice, the base station can set up the protocol setup information (e.g., network slice k=MAC, RLC setup required) required for the network slice in the terminal and the base station.

At this time, if the PDCP layer does not exist in the protocol setup information, in step S1010, the base station can transmit a security mode command (SecurityModeCommand) message to the terminal. At this time, the security mode command message may include a NULL algorithm and a network slice identifier (e.g., NW slice ID=k).

When receiving such a message, the terminal can check that the security algorithm is not applied to the network slice k. Therefore, the terminal may not apply the security algorithm to the service provided through the network slice k.

In step S1020, the terminal receiving the security mode command message may transmit a security mode complete (SecurityModeComplete) message to the base station.

Figure 11:
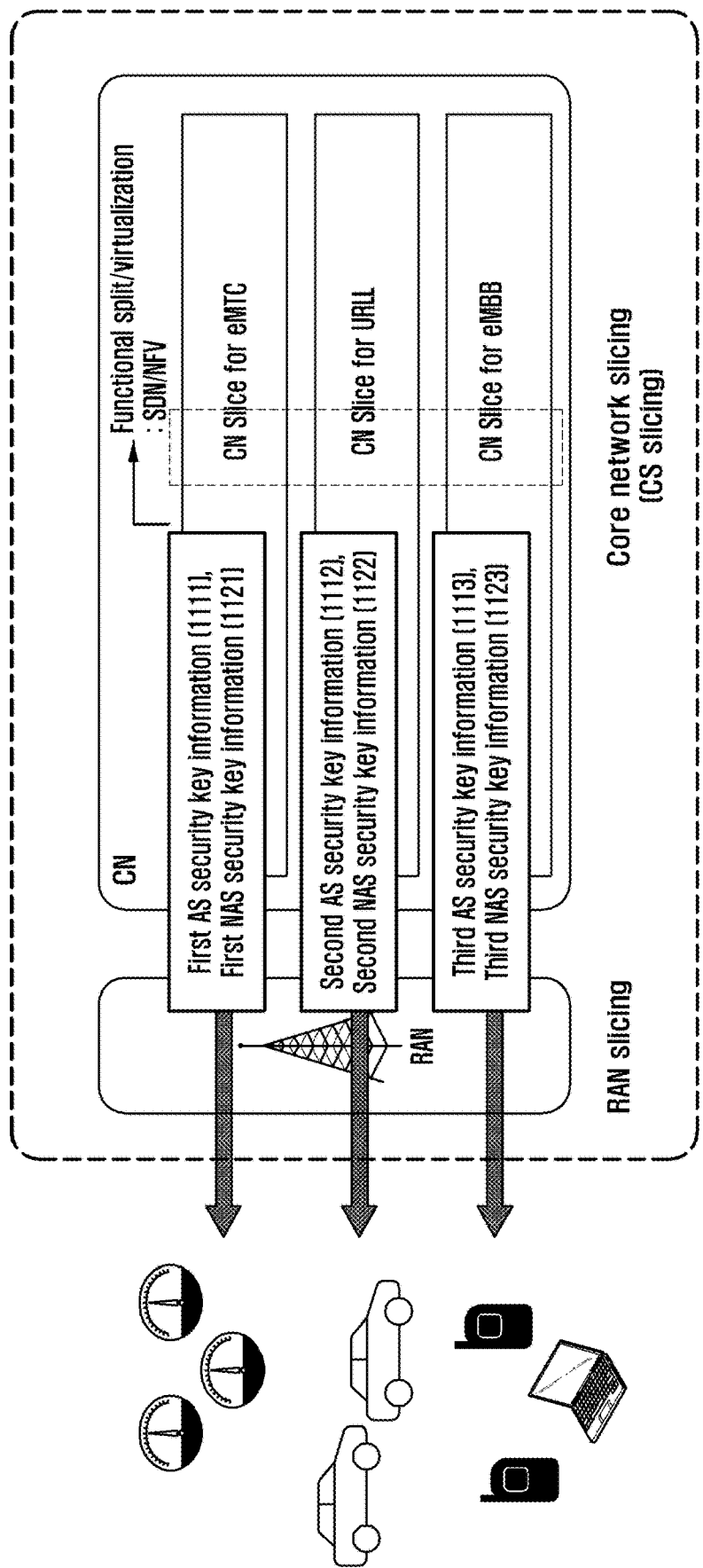
FIG. 11 illustrates network architecture according to another embodiment of the present embodiment.

FIG. 11 illustrates network architecture according to another embodiment of the present embodiment.

FIG. 11 illustrates a case where the network slice includes a plurality of NAS connections and a plurality of AS connections.

Referring to FIG. 11, since the network slice includes the plurality of NAS connections, the terminal may use a plurality of NAS security key information for each network slice. According to the present disclosure, the plurality of NAS security key information may each include first NAS security key information 1121, second NAS security key information 1122, and third NAS security key information 1123.

Further, since the network slice includes the plurality of AS connections, the terminal may use different AS security key information for each network slice. In the present disclosure, the plurality of AS security key information may include first AS security key information 1111, second AS security key information 1112, and third AS security key information 1113. However, the scope of the present disclosure is not limited thereto, and the number of NAS security keys and the number of AS security key information may be changed.

In this way, various methods can be used to generate different NAS security key information and AS security key information for each network slice. The detailed content thereof will be described below.

Figure 12A:
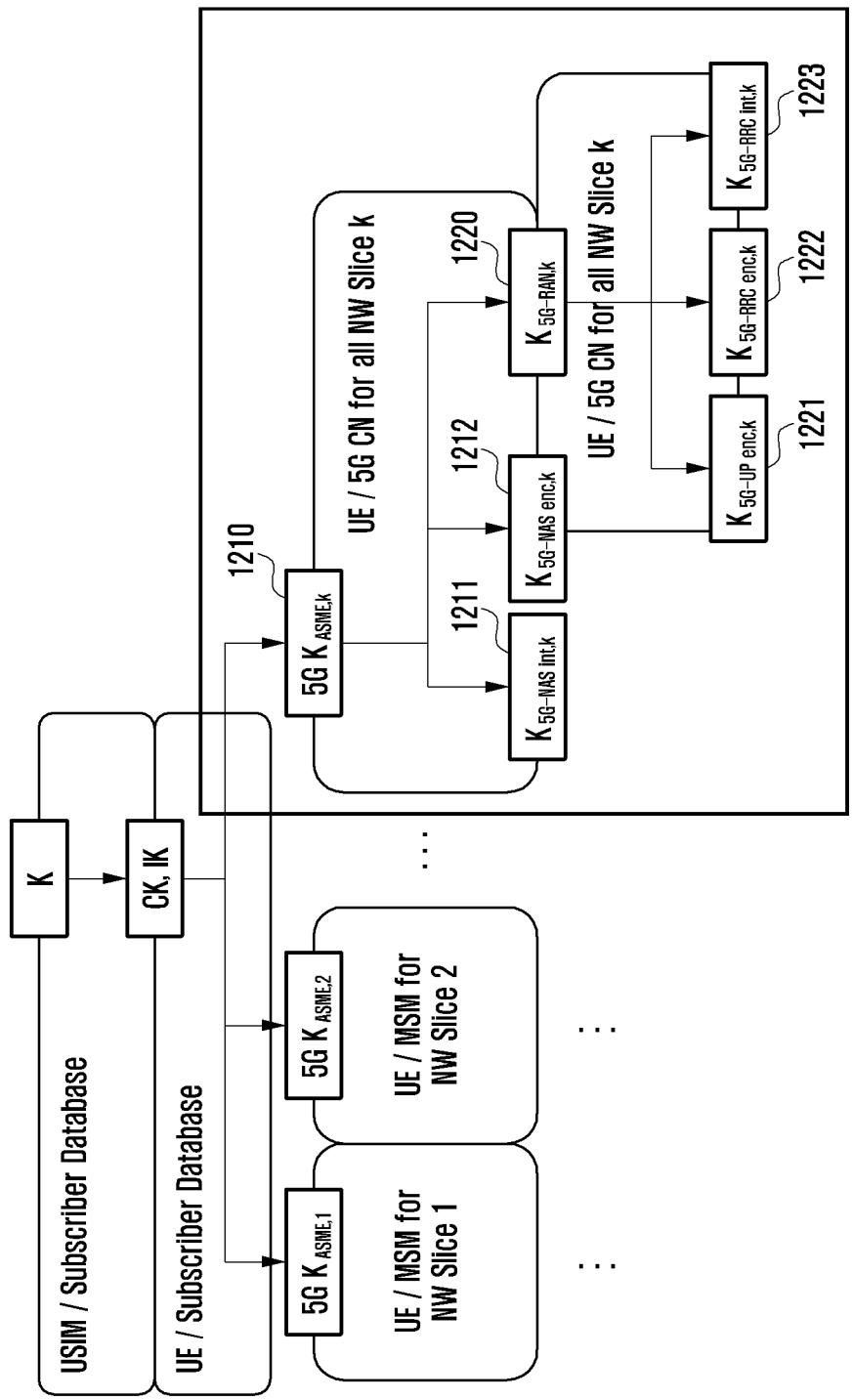
FIG. 12A illustrates a method for generating security keys for each network slice according to another embodiment of the present disclosure.

FIG. 12A illustrates a method for generating security keys for each network slice according to another embodiment of the present disclosure.

Referring to FIG. 12A, the terminal may use the user specific key K and the security keys CK and IK derived from the user specific key K to generate the NAS security key information $K_{ASME,K}$ for each network slice.

Specifically, the terminal may use the K stored in USIM and the network may use the K stored in HSS, thereby deriving the CK and IK. The terminal may use the derived CK and IK to generate a plurality of authentication key vectors and then transmit the generated authentication key vectors to the core network. Accordingly, the network may use the received various authentication key vectors to generate the plurality of NAS security key information.

Therefore, when receiving the message for the new network slice generation request from the terminal, the network may assign the non-assigned security key information among the NAS security key information generated by the received various authentication keys to the network slice.

Alternatively, the terminal can store different Ks for each network slice in the USIM, and can derive the detailed security key information for each network slice after the authentication procedure in the network for each network slice.

Therefore, the terminal can generate key information ($K_{5G\text{-}NAS\ int,\ k}$) 1211 for integrity verification and key information ($K_{5G\text{-}NAS\ enc,\ k}$) 1212 for encryption using the NAS security key information ($K_{ASME,\ K}$) 1210 generated for each network slice.

Furthermore, the terminal can generate AS security key information ($K_{5G\text{-}RAN,\ k}$) 1220 using the NAS security key information ($K_{ASME,\ K}$) 1210 generated for each network slice.

Therefore, the terminal may generate key information ($K_{5G\text{-}RRC\ int,\ k}$) 1223 for integrity verification and key information ($K_{5G\text{-}RRC\ enc,\ k}$) 1222 for encryption for control messages transmitted or received between the terminal and the base station using the AS security key information ($K_{5G\text{-}RAN,\ k}$) 1220, and the control messages between the terminal and the base station can be integrity protected and encrypted through the key information.

In addition, for the security of data transmitted or received between the base station and the terminal, the terminal can generate key information ($K_{5G\text{-}UPenc,\ k}$) 1221 for encryption for data transmitted or received by the terminal using the AS security key information ($K_{5G\text{-}RAN,\ k}$) 1220 generated for each network slice and can encrypt the data using the key information.

Figure 12B:
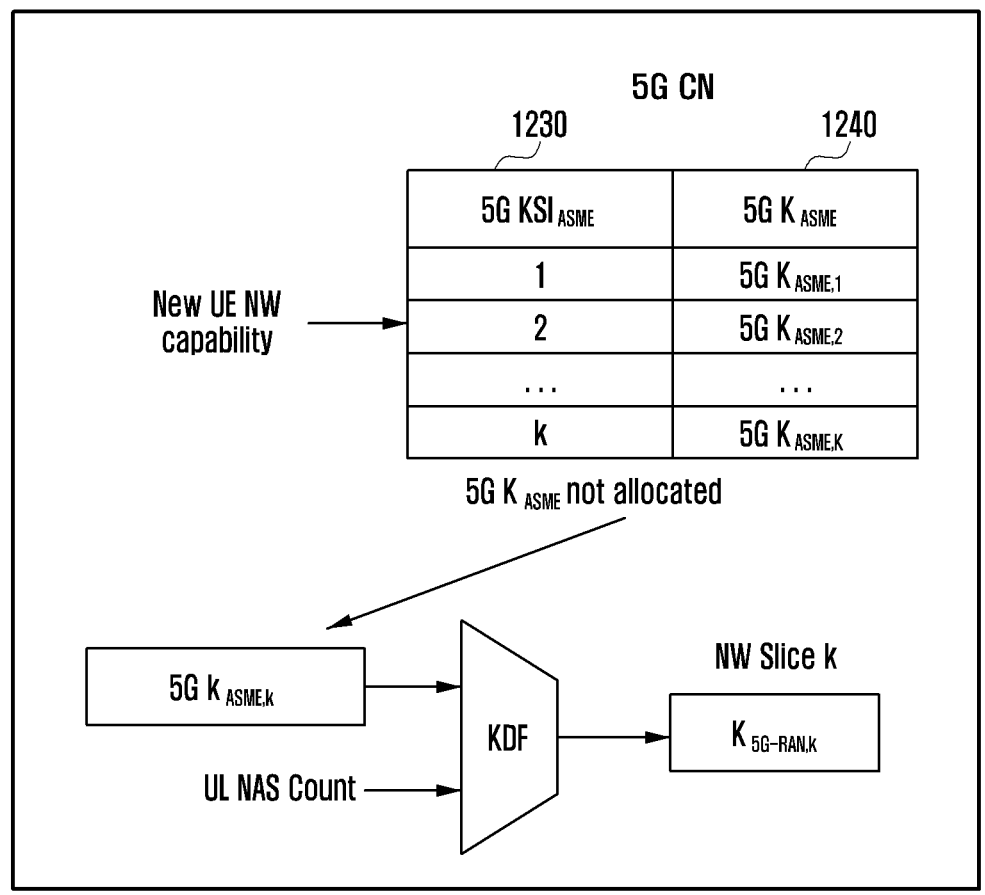
FIG. 12B illustrates the detailed method for generating security keys for each network slice according to another embodiment of the present disclosure.

FIG. 12B illustrates a method for generating security keys for each network slice according to another embodiment of the present disclosure.

As described above, the terminal uses the K stored in the USIM and the network uses the K stored in the HSS, such that the NAS security key information can be derived. At this time, the network can receive various authentication key indexes $KSI_{ASME}$ from an authentication server when generating the initial network slice. Accordingly, the network can select a key mapped to a corresponding index among a plurality of NAS security key information $K_{ASME,1}$, $K_{ASME,2}$, . . . , $K_{ASME,K}$ using the received various authentication key indexes. Therefore, when receiving the message for the new network slice generation request from the terminal, the network may assign the non-assigned security key information among the NAS security key information generated by the received various authentication key indexes to the network slice.

Alternatively, the terminal can generate the NAS security key information for each network slice using a token generated during an authentication procedure with the third party for each network slice.

The terminal can generate the AS security key information for each network slice using the NAS security key information and an uplink NAS count (UL NAS count) generated for each network slice.

FIG. 13 illustrates a method for controlling security according to another embodiment of the present disclosure.

Referring to FIG. 13, in step S1310, the core network can store the plurality of authentication key indexes $KSI_{ASME}$ received from the authentication server and a security key vector $K_{ASME,\ i}$ (or authentication key vector) extracted using the authentication key index. Specifically, the core network can generate the NAS security key vector $K_{ASME,\ i}$ and generate the specific NAS security key information $K_{ASME,\ k}$ for the network slice k using the authentication key index $KSI_{ASME}$ indicating i for each network slice. The process of generating the NAS security key information $K_{ASME,\ k}$ will be described later. In step S1320, the terminal can generate the UE capability. At this time, the UE capability generated by the terminal may mean UE capability including information on network slice and security capability (UE network capability for addressing NW slice or security capability). The network slice information includes a network slice indicator indicating a type of network slices (for example, what type of service the network slice is mapped to), information related to the number of network slices set in the terminal, identifier information of the network slice or the like.

In addition, the security capability may include information related to a security algorithm, information related to a security level, information related to security levels for each network slice, and security algorithm information depending on the security levels or the like.

The terminal may notify all the security algorithm information that can be supported by the terminal during the initial access to the network and may use specific algorithms determined for each network slice according to the network selection.

Thereafter, in step S1330, the terminal may transmit connection request messages for each network slice to the core network (NW slice k connection request). That is, the terminal may transmit the connection request messages to the core network to access the networks for each service. The connection request message may include the UE capability.

In addition, the connection request message may include, for example, a PDN connection request message. The terminal may transmit at least one connection request message to the core network to access at least one network slice. Alternatively, the terminal may transmit at least one connection request message to the core network to access at least one network slice.

In step S1340, the core network receiving the connection request message can generate the NAS security key information and the AS security key information. In step 1310, the core network can generate NAS security key information using the stored NAS security key vector $K_{ASME,\ i}$ and authentication key index $KSI_{ASME}$ and the core network can use the unused authentication key $KSI_{ASME}$. The detailed content is the same as above and therefore will be omitted below.

In addition, the core network can generate the AS security key information using the NAS security key information.

Further, in step S1350, the core network may transmit an initial context setup request message to the base station (e.g., 5G RAN).

The initial context setup request message may include a security context for the network slice. The security context may include at least one of the information related to the security algorithm, the network slice identifier information, the authentication key information $KSI_{ASME}$ used to generate the NAS authentication key information $K_{ASME,\ k}$, or the AS security key information.

As described above, according to the present disclosure, different security levels may be applied to each network slice. Accordingly, different algorithms may be applied to each network slice, and the core network may transmit the security algorithm information to be used for the network slice to the base station by including the security algorithm information in the initial context setup request message.

The base station may generate the key information for integrity protection and encryption for control messages and the key information for encryption for data using the security algorithm related information and the AS security key information $K_{5G\text{-}RAN,\ k}$ received for each network slice. Accordingly, the base station can use the key information to integrity protect and encrypt the control messages transmitted or received to or from the terminal and encrypt data.

In step S1360, the base station receiving the initial context setup message may store the AS security key information $K_{5G\text{-}RAN,\ k}$. The base station receiving the initial context setup message may store the AS security key information $K_{5G\text{-}RAN,\ k}$ for the network slice k. As described above, the base station can encrypt the control messages and the data transmitted or received to or from the terminal using the AS security key information $K_{5G\text{-}RAN,\ k}$.

Next, in step S1370, the base station may store the RRC connection reconfiguration (5G RRC connection reconfiguration) message or the attach accept message to the terminal. At this time, the RRC connection reconfiguration message or the attach accept message may include the authentication key information $KSI_{ASME}$ used to generate the NAS authentication key information $K_{ASME,\ k}$.

In step S1380, the terminal receiving the RRC connection reconfiguration message or the attach accept message may use the $KSI_{ASME}$ to generate the security context. That is, the terminal may generate the NAS security key information $K_{ASME,\ k}$ and the AS security key information $K_{5G\text{-}RAN,k}$ using $KSI_{ASME}$ and verify the security algorithm to be used to generate the security context.

Accordingly, the terminal and the base station can apply security to control messages and data using the security context. In addition, the terminal and the core network can apply security to messages transmitted or received therebetween using the security context.

Further, in step S1385, the terminal may transmit the RRC connection reconfiguration complete message (5G RRC connection reconfiguration complete) to the base station. In step S1390, the base station receiving the RRC connection reconfiguration complete message may transmit an initial context setup response message to the core network.

Figure 14:
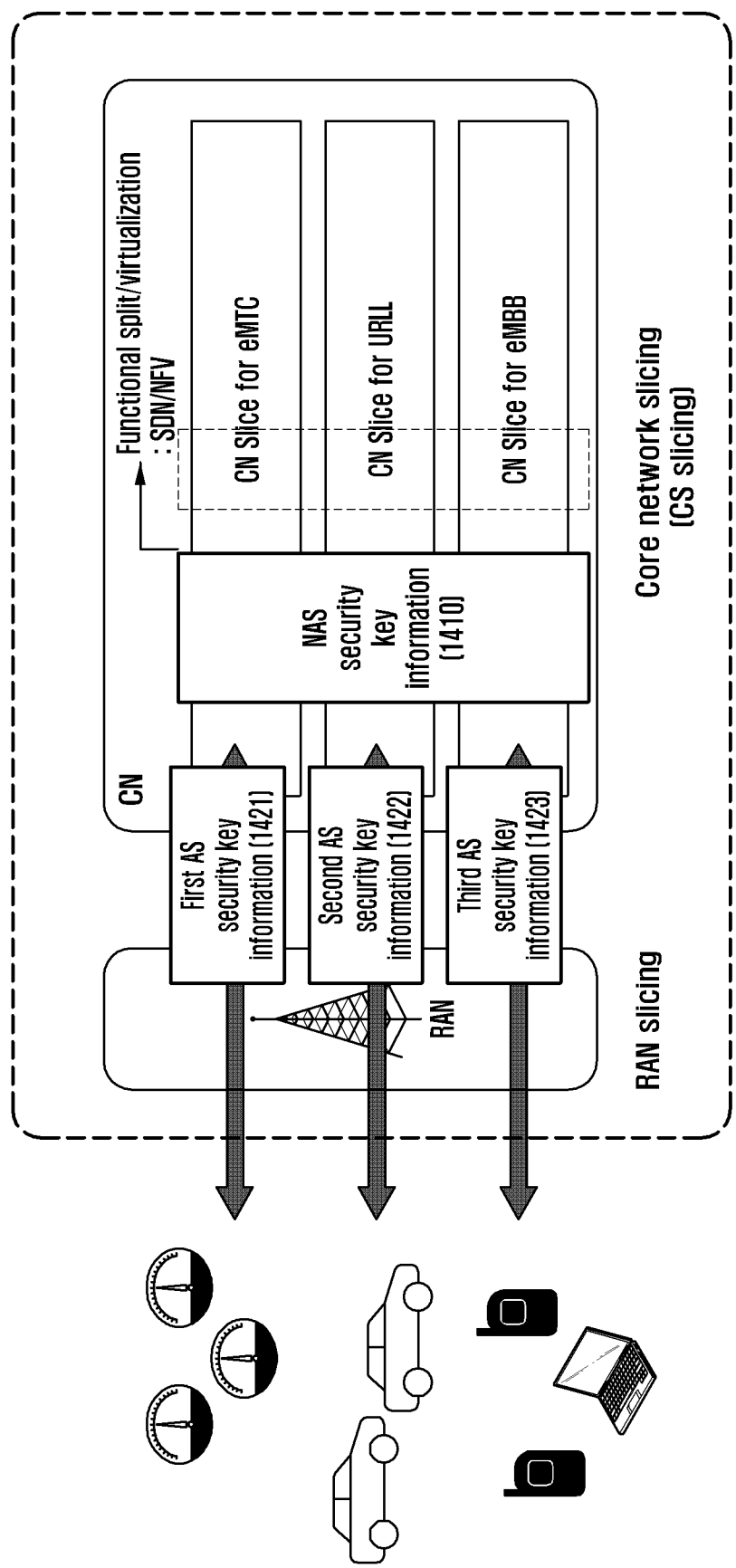
FIG. 14 illustrates a network architecture according to yet another embodiment of the present embodiment.

FIG. 14 illustrates network architecture according to yet another embodiment of the present embodiment.

FIG. 14 illustrates the case where the network slice includes the single NAS connection and the plurality of AS connections. However, according to the present embodiment, unlike FIG. 3, the plurality of AS connections uses the plurality of RRC connections.

Referring to FIG. 14, since the network slice includes the single NAS connection, the terminal may use the same NAS security key information 1410 for each network slice. Further, since the network slice includes the plurality of AS connections, the terminal may use different AS security key information for each network slice. In the present disclosure, first AS security key information 1421, second AS security key information 1422, and third AS security key information 1433 may be used. However, the scope of the present disclosure is not limited thereto, and the number of AS security key information may be changed.

As described above, the network slice identifier may be used to generate different AS security key information for each network slice. That is, the network slice identifier may be used as an input parameter to derive the AS security key information.

At this time, the terminal can use various methods for generating the AS security key information using the network slice identifier. The detailed content is the same as those described above and therefore will be omitted below.

In addition, the disclosure can independently operate the security algorithms for each network slice. The detailed content is the same as those described above and therefore will be omitted below.

In addition, according to the present disclosure, the core network can notify different security policies (or security setup information) for each network slice to the base station (RAN). The detailed content is the same as those described above and therefore will be omitted below.

Figure 15A:
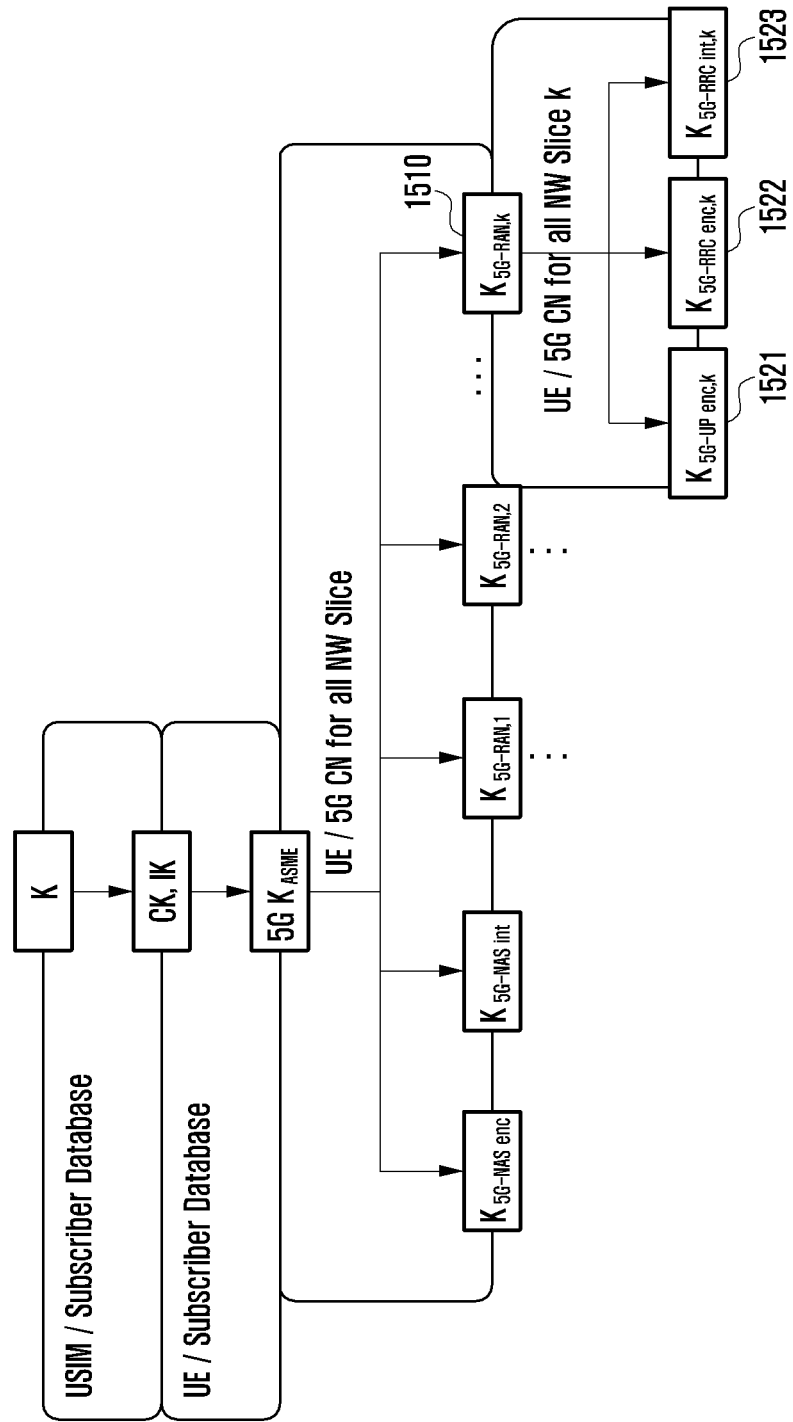
FIG. 15A illustrates a method for generating security keys for each network slice according to yet another embodiment of the present disclosure.

FIG. 15A illustrates a method for generating security keys for each network slice according to yet another embodiment of the present disclosure.

Referring to FIG. 15A, the terminal and the HSS may use the user specific key K and the security keys CK and IK derived from the user specific key K to generate the NAS security key information. In addition, the terminal and the core network may use the NAS security key information to generate the key information $K_{NAS\ int}$ for integrity verification and the key information $K_{NAS\ enc}$ for encryption. The detailed content thereof is similar to one described in FIG. 2B and therefore the description thereof will be omitted.

Therefore, the terminal can generate the key information $K_{5G\text{-}NAS\ int,\ k}$ for the integrity verification and the key information $K_{5G\text{-}NAS\ enc,\ k}$ for encryption using the NAS security key information $K_{ASME,\ K}$ generated for each network slice.

Meanwhile, the terminal may generate AS security key information $K_{5G\text{-}RAN,\ k}$ for each network slice using the NAS security key information.

Therefore, the terminal may generate key information $K_{5G\text{-}RRC\ int,\ k}$ for integrity verification and key information $K_{5G\text{-}RRC\ enc,\ k}$ for encryption for control messages that are transmitted or received between the terminal and the base station using the AS security key information $K_{5G\text{-}RAN,\ k}$ for the network slice k, and the control messages between the terminal and the base station can be integrity protected and encrypted through the key information.

In addition, for the security of data transmitted or received between the base station and the terminal, the terminal can generate key information $K_{5G\text{-}UP\ enc,\ k}$ for encryption for data transmitted or received by the terminal using the AS security key information $K_{5G\text{-}RAN,\ k}$ generated for each network slice and can encrypt the data using the key information.

At this time, the terminal can apply the network slice identifier as an additional input value to generate the AS security key information for each network slice.

Figure 15B:
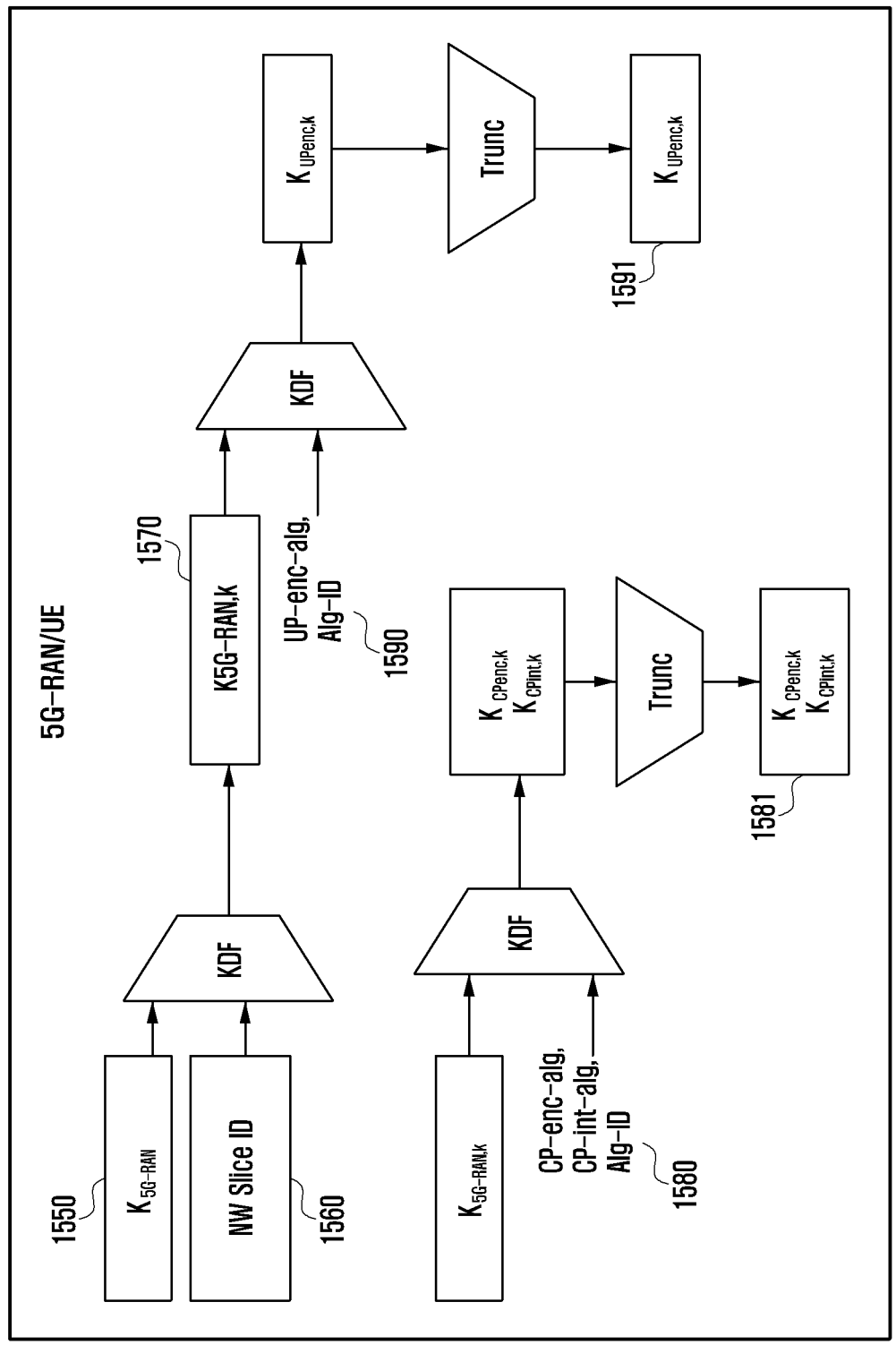
FIG. 15B illustrates a method for generating security keys for each network slice according to yet another embodiment of the present disclosure.

FIG. 15B illustrates a method for generating security keys for each network slice according to yet another embodiment of the present disclosure.

The terminal can generate basic AS security key information $K_{5G\text{-}RAN}$ 1550 using the NAS security key information and generate the AS security key information using the $K_{5G\text{-}RAN}$.

In addition, the terminal may use a network slice identifier 1560 as an input value in addition to the $K_{5G\text{-}RAN}$ to generate independent AS security key information for each network slice.

Accordingly, the terminal can derive the AS security key information $K_{5G\text{-}RAN,\ k}$ using the $K_{5G\text{-}RAN}$ and the network slice identifier.

Accordingly, the terminal can generate key information $K_{CPint,\ k}$ for integrity verification and key information $K_{CP\ enc,\ k}$ 1571 for encryption for control messages transmitted or received between the terminal and the base station for network slice k using the AS security key information $K_{5G\text{-}RAN,\ k}$.

At this time, the AS security key information ($K_{5G\text{-}RAN,\ k}$) 1570 may be used as an input parameter for integrity verification and encryption for control messages together with a control plane algorithm 1580. That is, the terminal may apply the control plane algorithm to the common security key to generate key information $K_{CPint,\ k}$ for integrity verification and key information ($K_{CP\ enc,\ k}$) 1571 for encryption for the control messages.

In addition, the AS security key information $K_{5G\text{-}RAN,\ k}$ 1570 may be used as an input parameter for encryption for data transmitted or received for the network slice k together with a data plane algorithm 1590. That is, the terminal apply the data plane algorithm 1590 to the AS security key information ($K_{5G\text{-}RAN,\ k}$) 1570 to generate key information ($K_{Upenc,\ k}$) 1595 for encryption for data.

Figure 16:
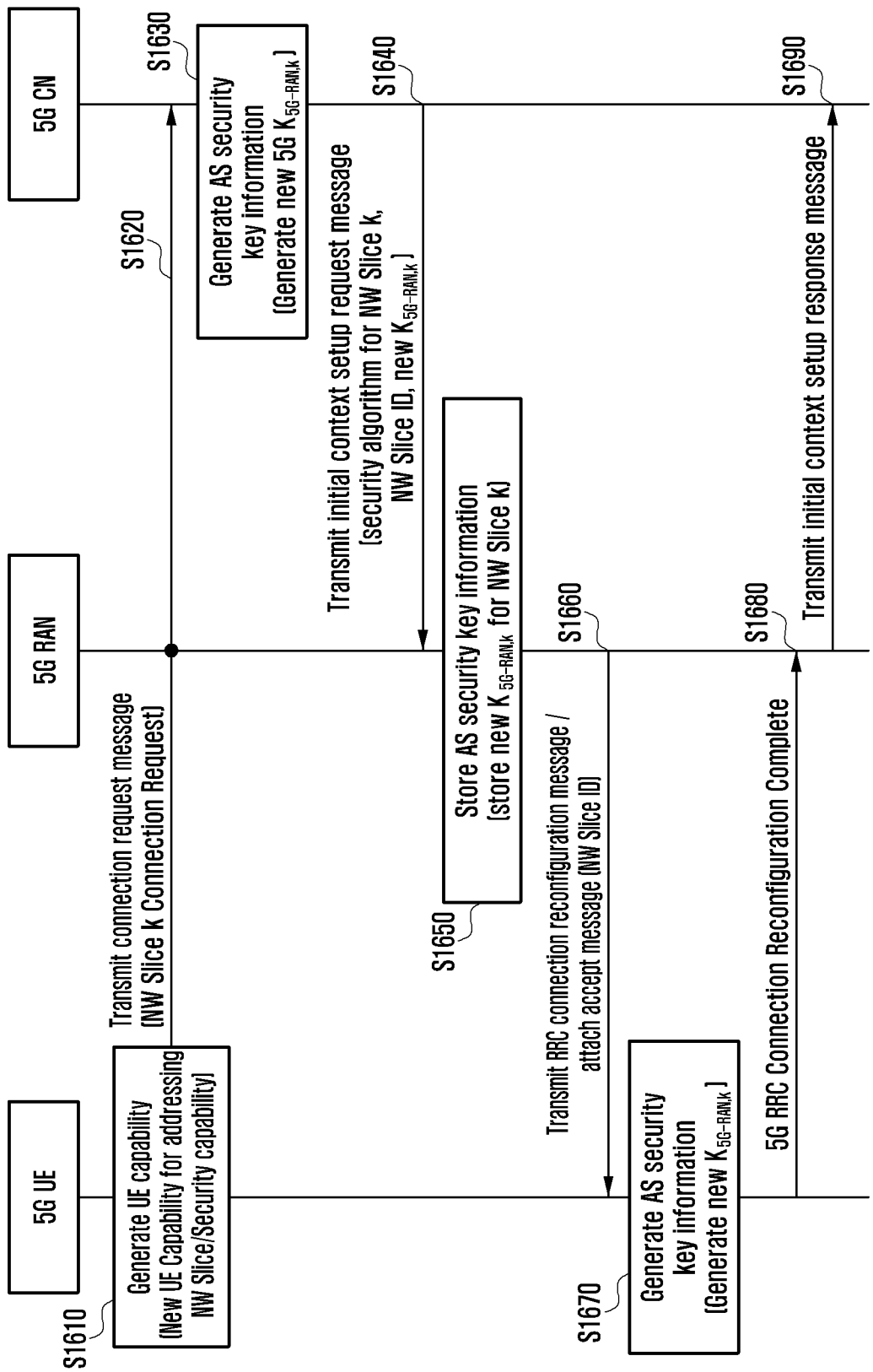
FIG. 16 illustrates a method for controlling security according to yet another embodiment of the present disclosure.

FIG. 16 illustrates a method for controlling security according to yet another embodiment of the present disclosure.

Referring to FIG. 16, in step S1610, the terminal may generate the UE capability. At this time, the UE capability generated by the terminal may mean the UE network capability including information on network slice and security capability (UE network capability for addressing NW slice or security capability).

The network slice information includes a network slice indicator indicating a type of network slices (for example, what type of service the network slice is mapped to), information related to the number of network slices set in the terminal, identifier information of the network slice or the like. In addition, the security capability may include information related to a security algorithm, information related to a security level, information related to security levels for each network slice, and security algorithm information depending on the security levels or the like. The terminal may notify all the security algorithm information that can be supported by the terminal during the initial access to the network and may use specific algorithms determined for each network slice according to the network selection.

Thereafter, in step S1620, the terminal may transmit connection request messages for each network slice to the core network (NW slice k connection request). That is, the terminal may transmit the connection request messages to the core network to access the networks for each service. The connection request message may include the UE capability.

In addition, the connection request message may include, for example, a PDN connection request message. The terminal may transmit at least one connection request message to the core network to access at least one network slice. Alternatively, the terminal may transmit at least one connection request message to the core network to access at least one network slice.

In step S1630, the core network receiving the connection request message may generate the AS security key information $K_{5G\text{-}RAN,\ k}$. At this time, the core network may use the received network slice identifier to generate the AS security key information $K_{5G\text{-}RAN,\ k}$ (using NW slice ID, generate new K5G-RAN, k).

Further, in step S1640, the core network may transmit an initial context setup request message to the base station (5G RAN).

The initial context setup request message may include the security context for the network slice. The security context may include at least one of the information related to the security algorithm, the network slice identifier information, and the AS security key information.

As described above, according to the present disclosure, different security levels may be applied to each network slice. Accordingly, different algorithms may be applied to each network slice, and the core network may transmit the initial context setup message including the security algorithm information to be used for the network slice to the base station.

The base station may generate the key information for encryption for data using the security algorithm related information and the AS security key information $K_{5G\text{-}RAN,\ k}$ received for each network slice, and uses the generated key information to encrypt data transmitted or received to or from the terminal.

In step S1650, the base station receiving the initial context setup message may store the AS security key information $K_{5G\text{-}RAN,\ k}$. The base station receiving the initial context setup message may store the AS security key information $K_{5G\text{-}RAN,\ k}$ for the network slice k. The base station can encrypt the data transmitted or received to or from the terminal using the AS security key information $K_{5G\text{-}RAN,\ k}$.

Next, in step S1660, the base station may transmit the RRC connection reconfiguration (5G RRC connection reconfiguration) message or the attach accept message to the terminal. At this point, the RRC connection reconfiguration message or the attach accept message may include the network slice identifier set by the terminal. Further, the RRC connection reconfiguration message or the attach accept message may include a network slice counter (NW slice counter). In addition, if a permanent network slice identifier is used, the network identifier may be stored in the terminal, and the base station may not include the network slice identifier in the RRC connection reconfiguration message or the attach accept message. However, the present disclosure is not limited thereto, and the permanent network slice identifier may also be received from the base station.

In step S1670, the terminal receiving the RRC connection reconfiguration message or the attach accept message may use the network slice identifier to generate a security context. That is, the terminal may use the network slice identifier to generate the AS security key information $K_{5G\text{-}RAN,\ k}$ and verify the security algorithm to be used to generate the security context.

Accordingly, the terminal and the base station can apply security to control messages and data using the security context.

Further, in step S1680, the terminal may transmit the RRC connection reconfiguration complete message (5G RRC connection reconfiguration complete) to the base station. In step S1690, the base station receiving the RRC connection reconfiguration complete message may transmit the initial context setup response message to the core network.

Figure 17:
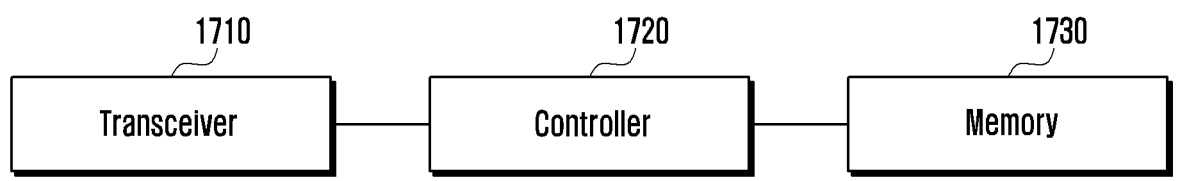
FIG. 17 illustrates a structure of a terminal according to an embodiment of the present disclosure.

FIG. 17 illustrates a structure of a terminal according to an embodiment of the present embodiment.

Referring to FIG. 17, the terminal of the present disclosure may include a transceiver 1710, a controller 1720, and a memory (or storage 1730. For example, when defining a controller in the specification, it may be stated that "the controller may be a circuit, an application-specific integrated circuit or at least one processor."

The transceiver 1710 may transmit or receive a signal to and from other network entities. The transceiver 1710 can transmit or receive control messages and data to/from the base station or the core network.

The controller 1720 can derive the security keys CK and IK using the K value stored in the USIM and generate the NAS security key information $K_{ASME}$ using the derived security keys CK and IK. Accordingly, the controller 1720 may use the NAS security key information to generate the key information $K_{NAS\ int}$ for integrity verification and the key information $K_{NAS\ enc}$ for encryption.

Also, the controller 1720 can perform a control to generate the common AS security key information $K_{5G\text{-}RAN}$ using the NAS security key information $K_{ASME}$. Further, the controller 1720 can generate the independent AS security key information $K_{5G\text{-}RAN,\ k}$ for each network slice using the common AS security key.

The controller 1720 may generate the key information $K_{5G\text{-}RRC\ int}$ for integrity verification and the key information $K_{5G\text{-}RRC\ enc}$ for encryption for control messages that are transmitted/received between the terminal and the base station using the common AS security key information. Alternatively, the controller 1720 may generate the key information $K_{5G\text{-}RRC\ int,\ k}$ for integrity verification and the key information $K_{5G\text{-}RRC\ enc,\ k}$ for encryption for control messages using the independent AS security key information for each network slice.

Further, the controller 1720 can generate the key information $K_{5G\text{-}UP\ enc,\ k}$ for encryption for data for each network slice using the AS security key information $K_{5G\text{-}RAN,\ k}$.

Alternatively, the controller 1720 may use the derived CK and IK to generate the plurality of authentication key vectors and then transmit the generated authentication key vectors to the core network. Accordingly, the controller 1720 may generate the NAS security key information for each network slice using the authentication key vector. Also, the controller 1720 can generate the AS security key information $K_{5G\text{-}RAN,\ k}$ for each network slice using the NAS security key information generated for each network slice.

Meanwhile, the controller 1720 may use the network slice identifier to generate the security key information. Alternatively, the controller 1720 may generate the security key information using the token (or authentication vector or authentication key) generated in the authentication process with the third party. The detailed content thereof is similar to those described above and therefore will be omitted below.

In addition, the controller 1720 may generate the common AS security key, and then transmit the connection request message to the core network. At this time, the connection request message may include the UE capability. The UE capability may include the network slice information and the security capability, and the detailed contents thereof are the same as those described above.

In addition, the controller 1720 may receive the RRC connection reconfiguration message or the attach accept message from the base station. The message may mean the response message to the connection request message of the terminal.

The RRC connection reconfiguration message or the attach accept message may include the network slice identifier established by the terminal. Alternatively, the RRC connection reconfiguration message or the attach accept message may include the authentication key information $KSI_{ASME}$ used to generate the NAS authentication key information $K_{ASME,\ k}$.

The controller 1720 may generate the security context using the received network slice identifier. That is, the controller 1720 may use the network slice identifier to generate the AS security key information $K_{5G\text{-}RAN,\ k}$ and verify the security algorithm to be used to generate the security context.

Accordingly, the controller 1720 can apply security to control messages and data using the security context.

Alternatively, the controller 1720 may generate the NAS security key information using the authentication key index $KSI_{ASME}$ received from the network, and may generate the AS security key information using the NAS security key information.

In addition, the controller 1720 may transmit the RRC reconfiguration complete message and may transmit the connection complete message.

The memory 1730 may store the UE capability. Also, the memory 1730 may store the information generated during the process of allowing the terminal to perform the security procedure. In addition, the memory 1730 may store the information to be transmitted or received under the control of the controller 1720.

Figure 18:
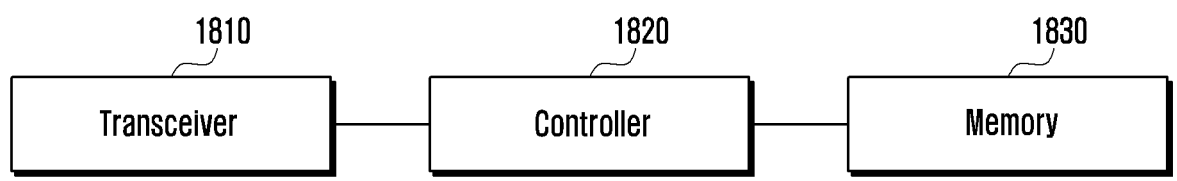
FIG. 18 illustrates a structure of a core network according to an embodiment of the present disclosure.

FIG. 18 illustrates a structure of a core network according to an embodiment of the present disclosure.

Referring to FIG. 18, the core network of the present disclosure may include a transceiver 1810, a controller 1820, and a memory (or storage) 1830. For example, when defining a controller in the specification, it may be stated that "the controller may be a circuit, an application-specific integrated circuit or at least one processor."

The transceiver 1810 may transmit or receive signals to and from other network entities. The transceiver 1810 can transmit or receive control messages to or from the terminal or the base station.

The controller 1820 can derive the security keys CK and IK using the K value stored in the USIM and generate the NAS security key information $K_{ASME}$ using the derived security keys CK and IK. Accordingly, the controller 1820 may use the NAS security key information to generate the key information $K_{NAS\ int}$ for integrity verification and the key information $K_{NAS\ enc}$ for encryption.

Also, the controller 1820 can perform a control to generate the common AS security key information $K_{5G\text{-}RAN}$ using the NAS security key information $K_{ASME}$. Further, the controller 1820 can generate the independent AS security key information $K_{5G\text{-}RAN,\ k}$ for each network slice using the common AS security key.

Alternatively, the controller 1820 may receive the plurality of authentication key vectors and authentication key index $KSI_{ASME}$ generated by allowing the terminal to use the CK and the IK. Accordingly, when the network includes the plurality of NAS connections, the controller 1820 may generate the NAS security key information for each network slice using the authentication key index. Also, the controller 1820 can generate the AS security key information $K_{5G\text{-}RAN,\ k}$ for each network slice using the NAS security key information generated for each network slice. The controller 1820 may perform a control to store the authentication key index $KSI_{ASME}$.

Meanwhile, the controller 1820 may use the network slice identifier to generate the security key information. Alternatively, the controller 1820 may generate the security key information using the token generated during the authentication process with the third party. The detailed content thereof is similar to those described above and therefore will be omitted below.

Further, the controller 1820 can receive the connection request message from the terminal. At this time, the connection request message may include the UE capability. The UE capability may include the network slice information and the security capability, and the detailed contents thereof are the same as those described above.

In addition, the controller 1820 can generate the AS security key information based on the UE capability received from the terminal. At this time, the controller 1820 may generate the AS security key information based on the identifier of the network slice. The detailed content thereof is the same as those described above and therefore will be omitted below.

After generating the AS security key information, the controller 1820 can transmit the initial context setup request message to the base station. The initial context setup request message may include a security context for the network slice. The security context may include at least one of the information related to the security algorithm, the network slice identifier information, and the AS security key information.

Further, when the network includes the plurality of NAS connections, the security context may include the authentication key index $KSI_{ASME}$.

Further, the controller 1820 may receive the initial context setup response message from the base station and receive the connection completion message.

In this way, the controller 1820 can encrypt and transmit the NAS message with the base station using the generated NAS security key information. In addition, the controller 1820 transmits the generated AS security key information to the base station, such that the AS security key information can be used for security of control messages and data transmitted between the base station and the terminal.

The memory 1830 may store the UE capability received from the terminal. Also, the memory 1830 may store the information generated during the process of allowing the core network to perform the security procedure. In addition, the memory 1830 may store the information to be transmitted or received under the control of the controller 1820.

Figure 19:
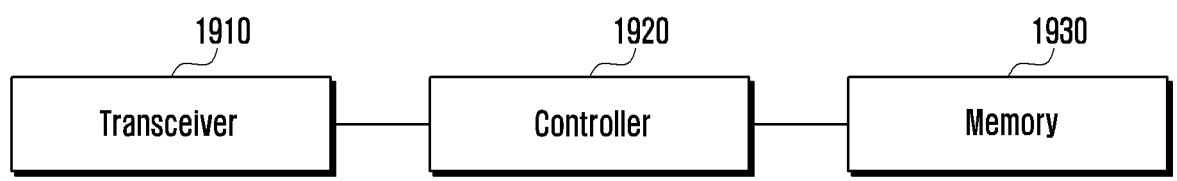
FIG. 19 illustrates a structure of a base station according to an embodiment of the present disclosure.

FIG. 19 illustrates a structure of a base station according to an embodiment of the present disclosure.

Referring to FIG. 19, the terminal of the present disclosure may include a transceiver 1910, a controller 1920, and a memory (or storage) 1930. For example, when defining a controller in the specification, it may be stated that "the controller may be a circuit, an application-specific integrated circuit or at least one processor."

The transceiver 1910 may transmit or receive signals to and from other network entities. The transceiver 1910 can transmit or receive control messages and data to or from the terminal or the core network.

The controller 1920 may receive the initial context setup request message from the core network. The initial context setup request message may include a security context for the network slice. The security context may include at least one of the information related to the security algorithm, the network slice identifier information, and the AS security key information.

Further, when the network includes the plurality of NAS connections, the security context may include the authentication key index $KSI_{ASME}$.

The controller 1930 receiving the initial context setup message can store the AS security key information. The controller 1930 may generate the key information $K_{5G\text{-}RRC\,int}$ for integrity verification and the key information $K_{5G\text{-}RRC\,enc}$ for encryption for control messages using the stored AS security key information. When the plurality of RRC connections are used, the controller 1930 may generate the $K_{5G\text{-}RRC\,int,\,k}$ and the $K_{5G\text{-}RRC\,enc,\,k}$ for each network slice. Also, the controller 1930 can generate the key information $K_{5G\text{-}UP\,enc,\,k}$ for encryption for data using the AS security key information.

In addition, the controller 1920 may transmit the RRC connection reconfiguration message or the attach accept message to the terminal. The RRC connection reconfiguration message or the attach accept message may include the network slice identifier established by the terminal.

Further, when the network includes the plurality of NAS connections, the RRC connection reconfiguration message or the attach accept message may include the authentication key index $KSI_{ASME}$ used to generate the NAS authentication key information $K_{ASME,\,k}$.

The controller 1920 can receive the RRC connection reconfiguration complete message from the terminal to transmit the initial context setup response message to the core network.

The memory 1930 may store the security context received from the core network. Further, the memory 1930 may store the AS security key information. Further, the memory 1930 may store the information generated during the process of allowing the base station to perform the security procedure. In addition, the memory 1930 may store the information to be transmitted or received under the control of the controller 1920.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    generating a first security key for an access to a core network, based on mutual authentication with a network entity of the core network;
    generating a second security key for an access to a base station (BS), based on the first security key;
    generating a third security key for a control message for a radio resource control (RRC) connection with the BS, based on the second security key;
    transmitting, to the BS, a connection request message for connecting to a network slice of a plurality of network slices associated with the BS and the core network, wherein the connection request message includes information of the network slice and a security capability of the terminal;
    receiving, from the BS, a connection response messages including a security context as a response to the connection request message, wherein the security context includes a network slice identifier (ID) for the network slice;
    generating a fourth security key for user plane data associated with the network slice, based on the second security key and the network slice ID within the security context; and
    transmitting, to the BS, a connection complete message, wherein the third security key is common for the plurality of network slices for the control message, and wherein the fourth security key is specific to the network slice for the user plane data.

2. The method of claim 1, further comprising transmitting or receiving the control message for the network slice, using the third security key generated for the plurality of network slices.

3. The method of claim 1, wherein the security context further includes security algorithms and security key information determined for the network slice, and
wherein the fourth security key is generated based on the security algorithms and the security key information within the security context.

4. A method performed by a base station (BS) in a wireless communication system, the method comprising:
receiving, from a network entity of a core network, a first security key for connecting to a terminal;
generating a second security key for a control message for a radio resource control (RRC) connection with the terminal, based on the first security key;
receiving, from the terminal, a connection request message for connecting to a network slice of a plurality of network slices associated with the BS and the core network, wherein the connection request message includes information of the network slice and a security capability of the terminal;
transmitting, to the network entity of the core network corresponding to the network slice, the connection request message;
receiving, from the network entity of the core network, a setup request message including a security context as a response to the connection request message, wherein the security context includes a network slice identifier (ID) for the network slice;
transmitting, to the terminal, a connection response message including the security context, wherein the connection response message is generated based on the setup request message;
generating a third security key for user plane data associated with the network slice, based on the first security key and the network slice ID within the security context;
receiving, from the terminal, a connection complete message; and
transmitting, to the network entity of the core network, a setup response message,
wherein the setup response message is generated based on the connection complete message,
wherein the second security key is common for the plurality of network slices for the control message, and
wherein the third security key is specific to the network slice for the user plane data.

5. The method of claim 4, further comprising:
transmitting or receiving the control message for the network slice, using the second security key generated for the plurality of network slices.

6. The method of claim 4, wherein the security context further includes security algorithms and security key information determined for the network slice, and
wherein the third security key is generated based on the security algorithms and the security key information within the security context.

7. A terminal in a wireless communication system, the terminal comprising:
a transceiver configured to transmit and receive signals; and
a controller coupled with the transceiver and configured to:
generate a first security key for an access to a core network, based on mutual authentication with a network entity of the core network,
generate a second security key for an access to a base station (BS), based on the first security key,
generate a third security key for a control message for a radio resource control (RRC) connection with the BS, based on the second security key,
transmit, to the BS, a connection request message for connecting to a network slice of a plurality of network slices associated with the BS and the core network, wherein the connection request message includes information of the network slice and a security capability of the terminal,
receive, from the BS, a connection response messages including a security context as a response to the connection request message, wherein the security context includes a network slice identifier (ID) for the network slice,
generate a fourth security key for user plane data associated with the network slice, based on the second security key and the network slice ID within the security context,
transmit, to the BS, a connection complete message,
wherein the third security key is common for the plurality of network slices for the control message, and
wherein the fourth security key is specific to the network slice for the user plane data.

8. The terminal of claim 7, wherein the controller is configured to transmit or receive the control message for the network slice, using the third security key generated for the plurality of network slices.

9. The terminal of claim 7, wherein the security context further includes security algorithms and security key information determined for the network slice, and
wherein the fourth security key is generated based on the security algorithms and the security key information within the security context.

10. A base station (BS) in a wireless communication system, the BS comprising:
a transceiver configured to transmit and receive signals; and
a controller coupled with the transceiver and configured to:
receive, from a network entity of a core network, a first security key for connecting to a terminal,
generate a second security key for a control message for a radio resource control (RRC) connection with the terminal, based on the first security key,
receive, from the terminal, a connection request message for connecting to a network slice of a plurality of network slices associated with the BS and the core network, wherein the connection request message includes information of the network slice and a security capability of the terminal,
transmit, to the network entity of the core network corresponding to the network slice, the connection request message,
receive, from the network entity of the core network, a setup request message including a security context as a response to the connection request message, wherein the security context includes a network slice identifier (ID) for the network slice,
transmit, to the terminal, a connection response message including the security context, wherein the connection response message is generated based on the setup request message;
generate a third security key for user plane data associated with the network slice, based on the first security key and the network slice ID within the security context, receive, from the terminal, a connection complete message, and transmit, to the network entity of the core network, a setup response message, wherein the setup response message is generated based on the connection complete message, wherein the second security key is common for the plurality of network slices for the control message, and wherein the third security key is specific to the network slice for the user plane data.

11. The BS of claim 10, the controller is configured to transmit or receive the control message for the network slice, using the second security key generated for the plurality of network slices.

12. The BS of claim 10, wherein the security context further includes security algorithms and security key information determined for the network slice, and wherein the third security key is generated based on the security algorithms and the security key information within the security context.

* * * * *